United States Patent
Konno et al.

[11] Patent Number: 6,010,537
[45] Date of Patent: Jan. 4, 2000

[54] ZOOM LENS SYSTEM HAVING AN IMAGE BLUR COMPENSATION FUNCTION

[75] Inventors: Kenji Konno, Daito; Hideki Nagata, Sakai, both of Japan

[73] Assignee: Minolta Co., Ltd., Osaki, Japan

[21] Appl. No.: 09/135,469

[22] Filed: Aug. 17, 1998

[30] Foreign Application Priority Data

Aug. 19, 1997  [JP]  Japan .................................. 9-222734
Aug. 19, 1997  [JP]  Japan .................................. 9-222735

[51] Int. Cl.$^7$ .................................................. G02B 15/14
[52] U.S. Cl. ......................... 659/389; 359/687; 359/688
[58] Field of Search ............................. 359/686, 689, 359/688, 687

[56] References Cited

U.S. PATENT DOCUMENTS 5,249,079  9/1993  Umeda et al. ......................... 359/554
5,760,957  6/1998  Suzuki .................................... 359/557

FOREIGN PATENT DOCUMENTS 5-224160   9/1993   Japan .
7-027978   1/1995   Japan .
7-318865  12/1995   Japan .
8-114771   5/1996   Japan .

*Primary Examiner*—Georgia Epps
*Assistant Examiner*—Michael A. Lucas
*Attorney, Agent, or Firm*—Sidley & Austin

[57] ABSTRACT

A zoom lens system has, from the object side, a first lens unit, a second lens unit with an aperture stop, and a third lens unit. In this zoom lens system, zooming is performed by varying the distances between these lens units; focusing from the infinite distance to the closest distance is performed by moving the first lens unit toward the object side along the optical axis; image blur compensation is performed by decentering an image blur compensating lens unit included in the third lens unit.

22 Claims, 22 Drawing Sheets

FNO=4.60
—— d
---- SC
-0.5  0.5
SPHERICAL SINE
ABERRATION CONDITION

Y'=17.3
---- DM
—— DS
-0.5  0.5
ASTIGMATISM

Y'=17.3
-5.0  5.0
DISTORTION %

FNO=6.20
—— d
---- SC
-0.5  0.5
SPHERICAL SINE
ABERRATION CONDITION

Y'=17.3
---- DM
—— DS
-0.5  0.5
ASTIGMATISM

Y'=17.3
-5.0  5.0
DISTORTION %

FNO=7.70
—— d
---- SC
-0.5  0.5
SPHERICAL SINE
ABERRATION CONDITION

Y'=17.3
---- DM
—— DS
-0.5  0.5
ASTIGMATISM

Y'=17.3
-5.0  5.0
DISTORTION %

EFFECTIVE FNO=3.20

—— d
---- SC

-0.5   0.5
SPHERICAL SINE
ABERRATION CONDITION

Y'=17.3

---- DM
—— DS

-0.5   0.5
ASTIGMATISM

Y'=17.3

-5.0   5.0
DISTORTION %

EFFECTIVE FNO=5.03

—— d
---- SC

-0.5   0.5
SPHERICAL SINE
ABERRATION CONDITION

Y'=17.3

---- DM
—— DS

-0.5   0.5
ASTIGMATISM

Y'=17.3

-5.0   5.0
DISTORTION %

EFFECTIVE FNO=7.71

—— d
---- SC

-0.5   0.5
SPHERICAL SINE
ABERRATION CONDITION

Y'=17.3

---- DM
—— DS

-0.5   0.5
ASTIGMATISM

Y'=17.3

-5.0   5.0
DISTORTION %

FNO=4.60

-0.5  0.5
SPHERICAL   SINE
ABERRATION  CONDITION
— d
---- SC

Y'=17.3

-0.5  0.5
ASTIGMATISM
---- DM
—— DS

Y'=17.3

-5.0  5.0
DISTORTION %

FNO=6.20

-0.5  0.5
SPHERICAL   SINE
ABERRATION  CONDITION
— d
---- SC

Y'=17.3

-0.5  0.5
ASTIGMATISM
---- DM
—— DS

Y'=17.3

-5.0  5.0
DISTORTION %

FNO=7.20

-0.5  0.5
SPHERICAL   SINE
ABERRATION  CONDITION
— d
---- SC

Y'=17.3

-0.5  0.5
ASTIGMATISM
---- DM
—— DS

Y'=17.3

-5.0  5.0
DISTORTION %

EFFECTIVE FNO=3.28

-0.5  0.5
SPHERICAL  SINE
ABERRATION CONDITION

— d
---- SC

Y'=17.3

-0.5  0.5
ASTIGMATISM

---- DM
— DS

Y'=17.3

-5.0  5.0
DISTORTION %

EFFECTIVE FNO=5.06

-0.5  0.5
SPHERICAL  SINE
ABERRATION CONDITION

— d
---- SC

Y'=17.3

-0.5  0.5
ASTIGMATISM

---- DM
— DS

Y'=17.3

-5.0  5.0
DISTORTION %

EFFECTIVE FNO=7.16

-0.5  0.5
SPHERICAL  SINE
ABERRATION CONDITION

— d
---- SC

Y'=17.3

-0.5  0.5
ASTIGMATISM

---- DM
— DS

Y'=17.3

-5.0  5.0
DISTORTION %

FNO=4.60

— d
---- SC

-0.5    0.5
SPHERICAL    SINE
ABERRATION    CONDITION

Y'=17.3

---- DM
— DS

-0.5    0.5
ASTIGMATISM

Y'=17.3

-5.0    5.0
DISTORTION %

FNO=6.20

— d
---- SC

-0.5    0.5
SPHERICAL    SINE
ABERRATION    CONDITION

Y'=17.3

---- DM
— DS

-0.5    0.5
ASTIGMATISM

Y'=17.3

-5.0    5.0
DISTORTION %

FNO=7.20

— d
---- SC

-0.5    0.5
SPHERICAL    SINE
ABERRATION    CONDITION

Y'=17.3

---- DM
— DS

-0.5    0.5
ASTIGMATISM

Y'=17.3

-5.0    5.0
DISTORTION %

EFFECTIVE FNO=3.06

—— d
---- SC

-0.5  0.5
SPHERICAL  SINE
ABERRATION  CONDITION

Y'=17.3

---- DM
—— DS

-0.5  0.5
ASTIGMATISM

Y'=17.3

-5.0  5.0
DISTORTION %

EFFECTIVE FNO=5.01

—— d
---- SC

-0.5  0.5
SPHERICAL  SINE
ABERRATION  CONDITION

Y'=17.3

---- DM
—— DS

-0.5  0.5
ASTIGMATISM

Y'=17.3

-5.0  5.0
DISTORTION %

EFFECTIVE FNO=7.19

—— d
---- SC

-0.5  0.5
SPHERICAL  SINE
ABERRATION  CONDITION

Y'=17.3

---- DM
—— DS

-0.5  0.5
ASTIGMATISM

Y'=17.3

-5.0  5.0
DISTORTION %

ZOOM LENS SYSTEM HAVING AN IMAGE BLUR COMPENSATION FUNCTION

This application is based on applications Nos. H9-222734 and H9-222735 filed in Japan, the content of which is hereby incorporated by reference.

BACKGROUND OF THE INVENTION

1. Field of the Invention

The present invention relates to a zoom lens system having an image blur compensation function, and more specifically to a zoom lens system having an image blur compensation function for use in a camera for shooting silver-halide film pictures, a camera for shooting video pictures (moving and still pictures), or a single-lens reflex camera, for example.

2. Description of the Prior Art

Conventionally, various types of zoom lens systems having an image blur compensation function have been proposed. For example, Japanese Laid-open Patent Application No. H7-27978 proposes a zoom lens system that is composed of, from the object side, a positive lens unit, a negative lens unit, a negative lens unit, and a positive lens unit and in which a single lens element included in the fourth lens unit or a doublet lens element constituting the third lens unit is moved in a direction perpendicular to the optical axis so as to compensate for an image blur. Moreover, Japanese Laid-open Patent Application No. H5-224160 proposes a zoom lens system that is composed of, from the object side, a positive lens unit, a negative lens unit, a positive lens unit, a positive lens unit, and a negative lens unit and in which the fifth lens unit is divided into a front lens unit having a negative optical power and a rear lens unit having a positive optical power. Here, image blur compensation is achieved by moving the front lens unit (composed of a plurality of lens elements). Furthermore, Japanese Laid-open Patent Application No. H7-318865 proposes a zoom lens system that is composed of, from the object side, a positive lens unit, a negative lens unit, a positive lens unit, a positive lens unit, and a negative lens unit and in which a doublet lens element constituting the fourth lens unit is moved in a direction perpendicular to the optical axis so as to compensate for an image blur. In addition, Japanese Laid-open Patent Application No. H8-114771, by the same inventors as the present invention, proposes a zoom lens system that is composed of, from the object side, a positive lens unit, a negative lens unit, a positive lens unit, and a positive lens unit and in which image blur compensation is achieved by moving a single lens element constituting the fourth lens unit.

In the zoom lens systems proposed in Japanese Laid-open Patent Applications Nos. H7-27978 and H7-318865 mentioned above, an aperture stop is provided in the fourth lens unit. On the other hand, in the zoom lens systems proposed in Japanese Laid-open Patent Applications Nos. H5-224160 and H8-114771 mentioned above, an aperture stop is provided in the third lens unit. In some of such conventional zoom lens systems, an image blur compensating lens unit and an aperture stop are provided in one zoom unit, and this inconveniently causes interference between the driving mechanism for driving the aperture stop and the driving mechanism for image blur compensation. To avoid this, it is inevitable to make the entire zoom unit including the driving mechanisms unduly large. This spoils compactness of the entire zoom lens system, making the camera as a whole unduly large. Similarly, in a zoom lens system in which a focusing lens unit and an aperture stop are provided in one zoom unit, or in a zoom lens system in which a focusing lens unit and an image blur compensating lens unit are provided in one zoom unit, interference between the driving mechanism for focusing and the driving mechanism for driving the aperture stop or for image blur compensation cannot be avoided unless the camera as a whole is made unduly large.

Moreover, in the zoom lens system proposed in Japanese Laid-open Patent Application No. H5-224160 and the like, the type of aberration called the off-axial image-point movement error, which is one of the aberrations caused by camera shake, is not properly corrected. Even if satisfactory imaging performance is secured during image blur compensation, large off-axial image-point movement errors occur unless distortion is properly corrected. This causes blurring of an image in its off-axial area when image blur compensation lasts for a relatively long time. In addition, since the front lens unit that is moved to achieve image blur compensation is composed of a plurality of lens elements, even though it is possible to correct the axial lateral chromatic aberration that occurs during image blur compensation, the weight of the image blur compensating lens unit is too large to be comfortably borne by the driving mechanism for image blur compensation. In contrast, in a zoom lens system that has an image blur compensating lens unit composed of a single lens element, the weight to be borne by the driving mechanism for image blur compensation is minimal, but it is impossible to correct the axial lateral chromatic aberration that occurs when decentering is effected. Furthermore, with some zoom lens systems for which no specific focusing method is disclosed, it is difficult to secure satisfactory imaging performance for a closest distance object because they do not provide appropriate focusing solutions despite having an image blur compensation function.

SUMMARY OF THE INVENTION

An object of the present invention is to provide a zoom lens system having an image blur compensation function that offers excellent optical performance in a compact structure.

To achieve the above object, according to one aspect of the present invention, a zoom lens system is provided with, from the object side, a first zoom unit that is moved for focusing, a second zoom unit having an aperture stop, and a third zoom unit including an image blur compensating lens unit that is moved for image blur compensation. This zoom lens system performs zooming by varying the distances between these zoom units.

To achieve the above object, according to another aspect of the present invention, a zoom lens system is provided with, from the object side, a first lens unit having a positive optical power, a second lens unit having a negative optical power, a third lens unit having a positive optical power, and a fourth lens unit having a negative optical power. In this structure, the fourth lens unit is disposed at the image-side end, and the third lens unit disposed immediately on the object side of the fourth lens unit acts as an image blur compensating lens unit by being decentered in a direction perpendicular to the optical axis so as to achieve image blur compensation. Additionally, the zoom lens system is so designed that the ratios of the focal lengths f1 and f2 of the first and second lens units to the focal length fW of the entire zoom lens system at the wide-angle end fulfill the conditions $1.5 < f1/fW < 6.0$, and $-1.0 < f2/fW < -0.20$, that the ratio of the focal length fB of the third lens unit to the focal length fR of the fourth lens unit fulfills the condition $-1.5 < fB/fR < -0.3$, and that the ratio of the focal length fB of the third lens unit to the focal length fW of the entire zoom lens system at the wide-angle end fulfills the condition 0.8<fB/fW<4.0.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
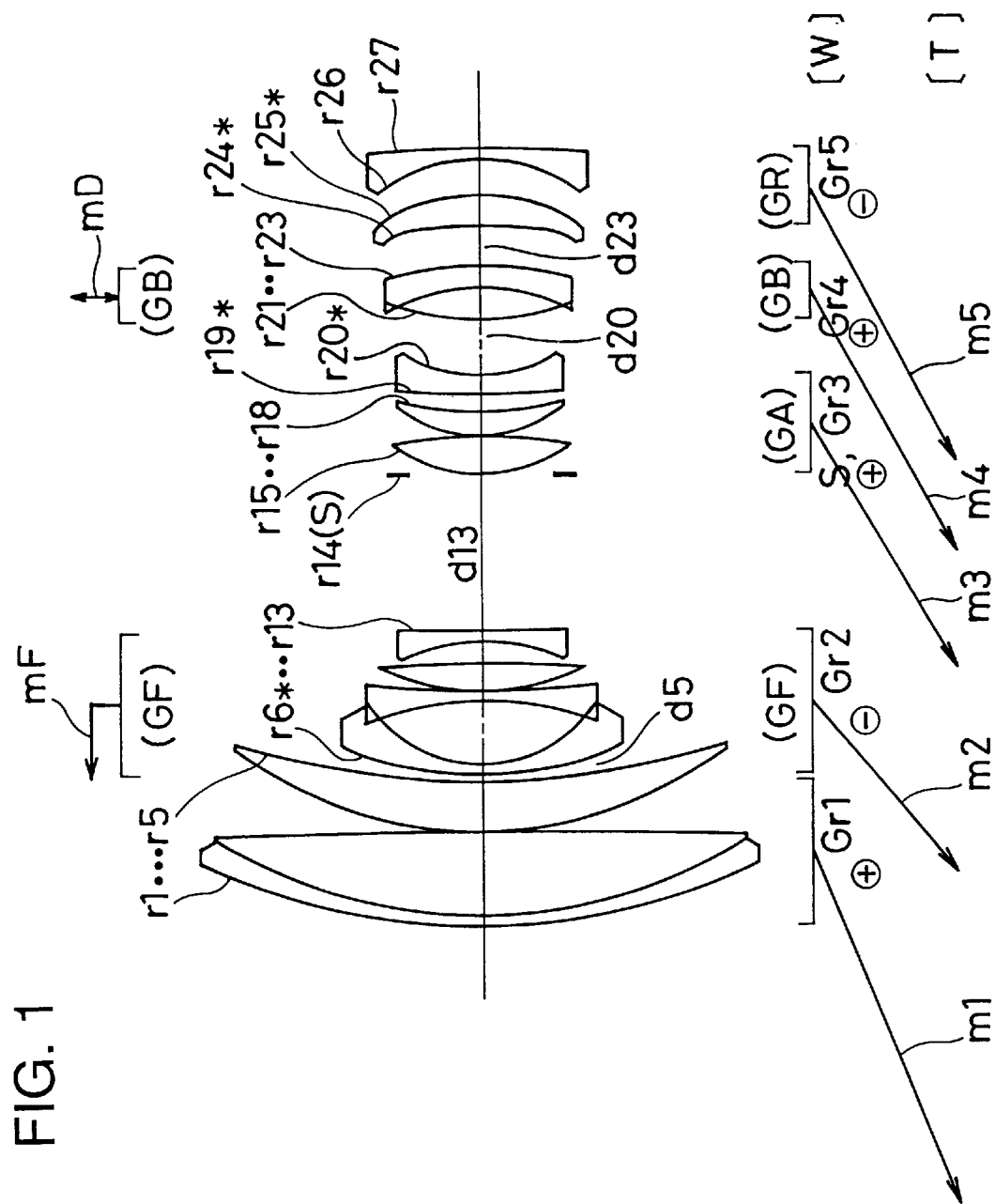
FIG. 1 is a lens arrangement diagram of the zoom lens system of a first embodiment of the present invention.
Figure 8:
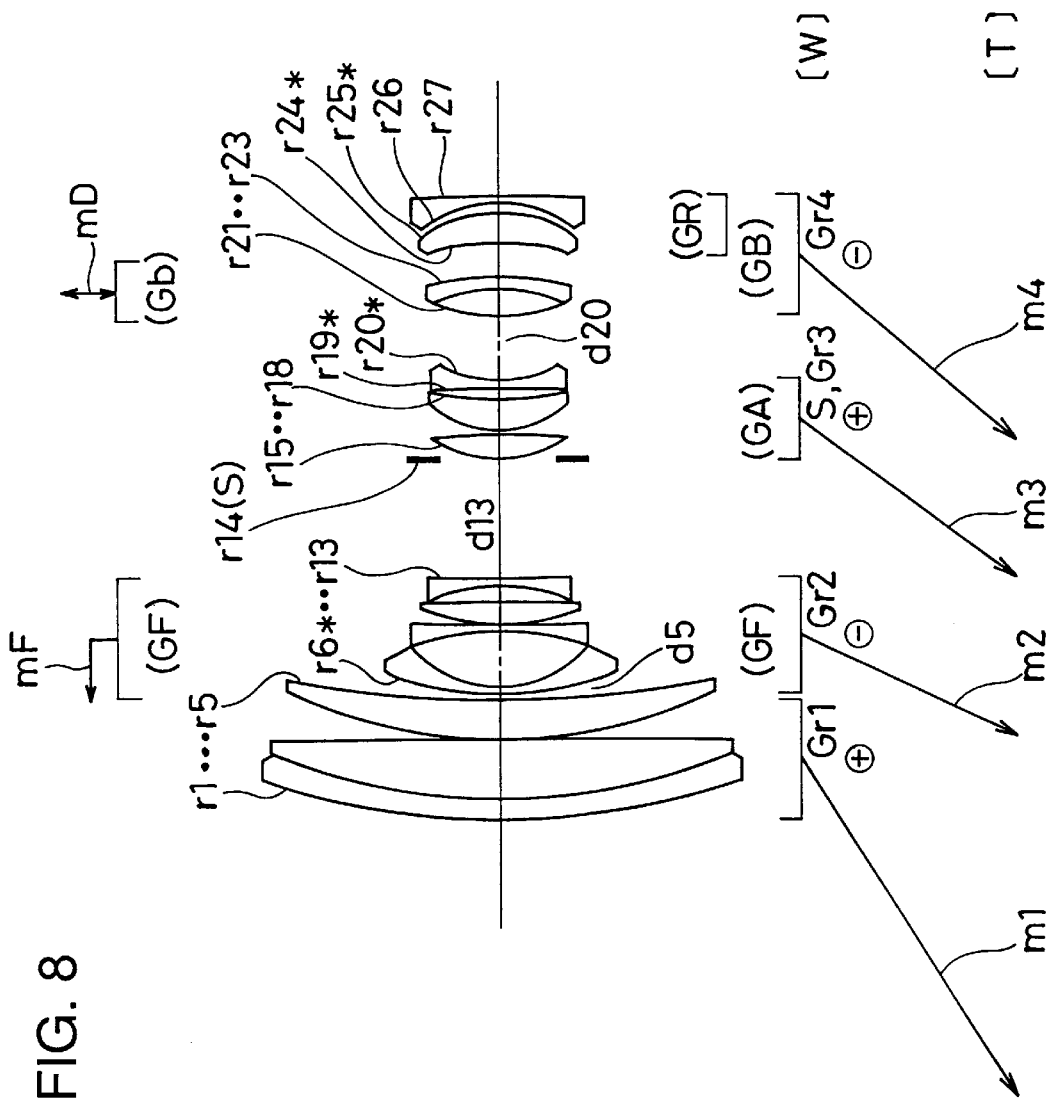
FIG. 8 is a lens arrangement diagram of the zoom lens system of a second embodiment of the present invention.
Figure 15:
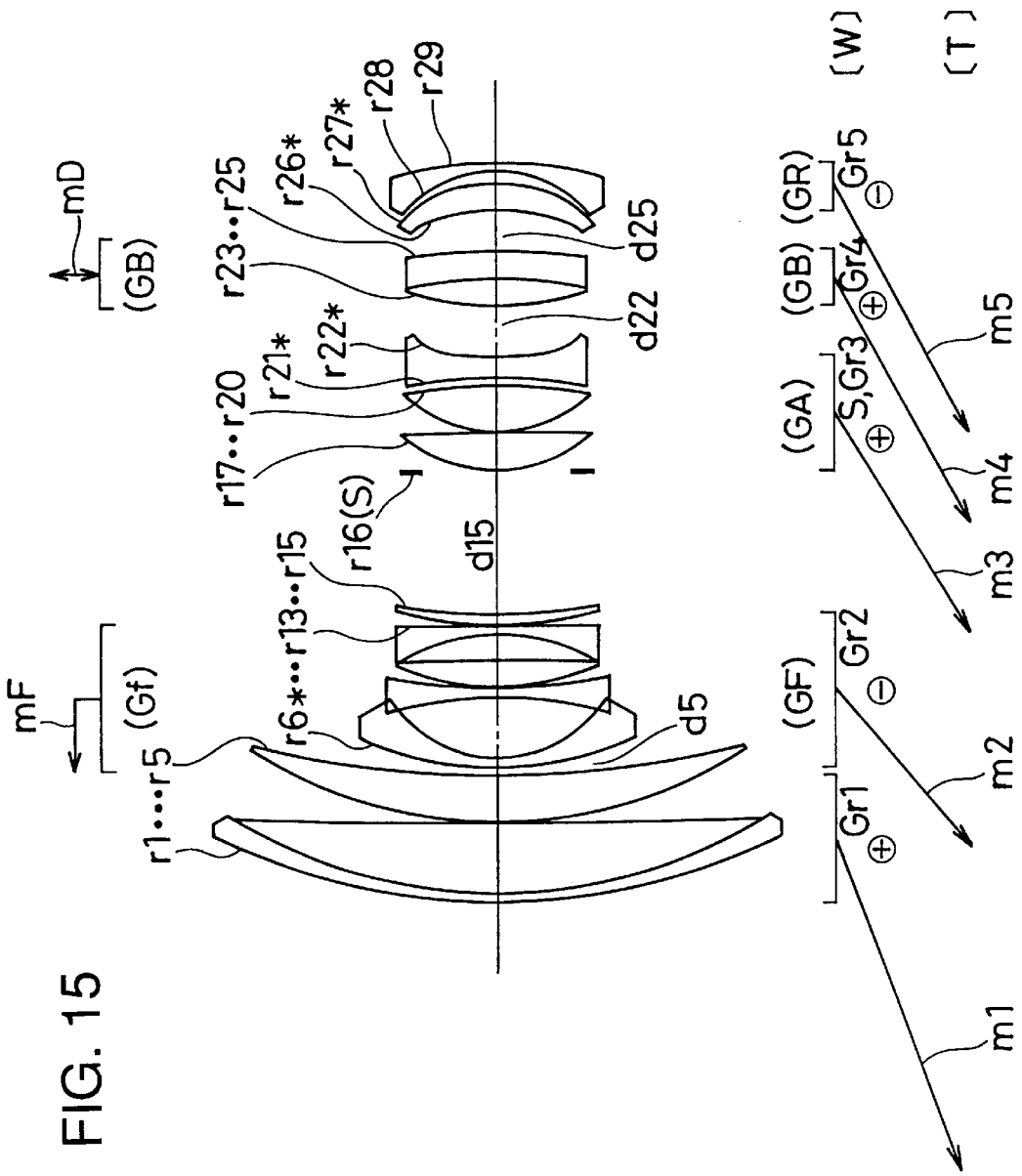
FIG. 15 is a lens arrangement diagram of the zoom lens system of a third embodiment of the present invention.

Hereinafter, zoom lens systems having an image blur compensation function embodying the present invention will be described with reference to the corresponding drawings. FIGS. 1, 8, and 15 show the lens arrangement of the zoom lens systems of the first to third embodiments, respectively, as observed at the wide-angle end [W] (i.e. in the shortest focal length condition). In each lens arrangement diagram, arrow mi (i=1, 2, 3, ...) schematically shows the movement of the ith lens unit (Gri) during zooming from the wide-angle end [W] to the telephoto end [T]. Moreover, in each lens arrangement diagram, a surface marked with ri (i=1, 2, 3, ...) is the ith surface counted from the object side, and a surface ri marked with an asterisk (*) is an aspherical surface. Furthermore, di (i=1, 2, 3, ...) represents the ith axial distance counted from the object side, though only those axial distances between the lens units that vary with zooming are shown. Note that, in each lens arrangement diagram, arrow mD indicates the translational decentering of the image blur compensating lens unit (i.e. the movement in a direction perpendicular to the optical axis), and arrow mF indicates the focusing movement of the focusing lens unit.

In the first embodiment, the zoom lens system is composed of five lens units that are, from the object side, a first lens unit having a positive optical power (Gr1), a second lens unit having a negative optical power (Gr2), a third lens unit having a positive optical power (Gr3), a fourth lens unit having a positive optical power (Gr4), and a fifth lens unit having a negative optical power (Gr5). As indicated by arrows m1 to m5 in FIG. 1, during zooming from the wide-angle end [W] to the telephoto end [T], the lens units are moved in such a way that the distance between the first and second lens units (Gr1 and Gr2) increases, that the distance between the second and third lens units (Gr2 and Gr3) decreases, that the distance between the third and fourth lens units (Gr3 and Gr4) decreases, and that the distance between the fourth and fifth lens units (Gr3 and Gr5) decreases. Note that, between the surface provided at the image-side end of the second lens unit (Gr2) and the surface provided at the object-side end of the third lens unit (Gr3), an aperture stop (S) is disposed which is moved together with the third lens unit (Gr3) during zooming.

In the zoom lens system of the first embodiment, each lens unit is composed, from the object side, as follows. The first lens unit (Gr1) is composed of a doublet lens element formed by cementing together a negative meniscus lens element convex to the object side and a positive biconvex lens element, and a positive meniscus lens element convex to the object side. The second lens unit (Gr2) is composed of a negative meniscus lens element convex to the object side, a negative biconcave lens element, a positive biconvex lens element, and a negative meniscus lens element concave to the object side. The third lens unit (Gr3) is composed of a positive biconvex lens element, a positive meniscus lens element convex to the object side, and a negative meniscus lens element convex to the object side. The fourth lens unit (Gr4) is composed of a doublet lens element formed by cementing together a positive biconvex lens element and a negative meniscus lens element convex to the image side. The fifth lens unit (Gr5) is composed of a positive meniscus lens element convex to the image side, and a negative meniscus lens element concave to the object side.

In the zoom lens system of the first embodiment, the second lens unit (Gr2) serves as a focusing lens unit (GF), and the fourth lens unit (Gr4) serves as an image blur compensating lens unit (GB). That is, as indicated by arrow mF in FIG. 1, the second lens unit (Gr2) is moved along the optical axis toward the object side so as to achieve focusing from an infinite distance object to a closest distance object, and, as indicated by arrow mD in FIG. 1, the fourth lens unit (Gr4) is decentered in a direction perpendicular to the optical axis so as to achieve image blur compensation.

In the second embodiment, the zoom lens system is composed of four lens units that are, from the object side, a first lens unit having a positive optical power (Gr1), a second lens unit having a negative optical power (Gr2), a third lens unit having a positive optical power (Gr3), and a fourth lens unit having a negative optical power (Gr4). As indicated by arrows m1 to m4 in FIG. 8, during zooming from the wide-angle end [W] to the telephoto end [T], the lens units are moved in such a way that the distance between the first and second lens units (Gr1 and Gr2) increases, that the distance between the second and third lens units (Gr2 and Gr3) decreases, and that the distance between the third and fourth lens units (Gr3 and Gr4) decreases. Note that, between the surface provided at the image-side end of the second lens unit (Gr2) and the surface provided at the object-side end of the third lens unit (Gr3), an aperture stop (S) is disposed which is moved together with the third lens unit (Gr3) during zooming.

In the zoom lens system of the second embodiment, each lens unit is composed, from the object side, as follows. The first lens unit (Gr1) is composed of a doublet lens element formed by cementing together a negative meniscus lens element convex to the object side and a positive biconvex lens element, and a positive meniscus lens element convex to the object side. The second lens unit (Gr2) is composed of a negative meniscus lens element convex to the object side, a negative biconcave lens element, a positive biconvex lens element, and a negative biconcave lens element. The third lens unit (Gr3) is composed of a positive biconvex lens element, a positive meniscus lens element convex to the object side, and a negative meniscus lens element convex to the object side. The fourth lens unit (Gr4) is composed of a doublet lens element formed by cementing together a positive biconvex lens element and a negative meniscus lens element convex to the image side, a positive meniscus lens element convex to the image side, and a negative meniscus lens element concave to the object side.

In the zoom lens system of the second embodiment, the second lens unit (Gr2) serves as a focusing lens unit (GF), and the doublet lens element included in the fourth lens unit (Gr4) serves as an image blur compensating lens unit (Gb). That is, as indicated by arrow mF in FIG. 8, the second lens unit (Gr2) is moved along the optical axis toward the object side so as to achieve focusing from an infinite distance object to a closest distance object, and, as indicated by arrow mD in FIG. 8, the image blur compensating lens unit (Gb) included in the fourth lens unit (Gr4) is decentered in a direction perpendicular to the optical axis so as to achieve image blur compensation.

In the third embodiment, the zoom lens system is composed of five lens units that are, from the object side, a first lens unit having a positive optical power (Gr1), a second lens unit having a negative optical power (Gr2), a third lens unit having a positive optical power (Gr3), a fourth lens unit having a positive optical power (Gr4), and a fifth lens unit having a negative optical power (Gr5). As indicated by arrows m1 to m5 in FIG. 15, during zooming from the wide-angle end [W] to the telephoto end [T], the lens units are moved in such a way that the distance between the first and second lens units (Gr1 and Gr2) increases, that the distance between the second and third lens units (Gr2 and Gr3) decreases, that the distance between the third and fourth lens units (Gr3 and Gr4) decreases, and that the distance between the fourth and fifth lens units (Gr3 and Gr5) decreases. Note that, between the surface provided at the image-side end of the second lens unit (Gr2) and the surface provided at the object-side end of the third lens unit (Gr3), an aperture stop (S) is disposed which is moved together with the third lens unit (Gr3) during zooming.

In the zoom lens system of the third embodiment, each lens unit is composed, from the object side, as follows. The first lens unit (Gr1) is composed of a doublet lens element formed by cementing together a negative meniscus lens element convex to the object side and a positive meniscus lens element concave to the image side, and a positive meniscus lens element convex to the object side. The second lens unit (Gr2) is composed of a negative meniscus lens element convex to the object side, a negative biconcave lens element, a positive biconvex lens element, a negative meniscus lens element concave to the object side, and a positive meniscus lens element convex to the object side. The third lens unit (Gr3) is composed of two positive biconvex lens elements, and a negative biconcave lens element. The fourth lens unit (Gr4) is composed of a doublet lens element formed by cementing together a positive biconvex lens element and a negative meniscus lens element convex to the image side. The fifth lens unit (Gr5) is composed of a positive meniscus lens element convex to the image side, and a negative meniscus lens element concave to the object side.

In the zoom lens system of the third embodiment, four lens elements (r6 to r13) included in the second lens unit (Gr2) constitute a focusing lens unit (Gf), and the fourth lens unit (Gr4) serves as an image blur compensating lens unit (GB). That is, as indicated by arrow mF in FIG. 15, the focusing lens unit (Gf) included in the second lens unit (Gr2) is moved along the optical axis toward the object side so as to achieve focusing from an infinite distance object to a closest distance object, and, as indicated by arrow mD in FIG. 15, the entire fourth lens unit (Gr4) is decentered in a direction perpendicular to the optical axis so as to achieve image blur compensation.

As described above, in the zoom lens systems of the first to third embodiments, zooming is achieved by varying the distances between the zoom units, focusing is achieved by moving the whole (GF) or a part (Gf) of the second lens unit (Gr2) placed on the object side of the third lens unit (Gr3) along the optical axis, and image blur compensation is achieved by decentering the whole (GB) or a part (Gb) of the fourth lens unit (Gr2) placed on the image side of the third lens unit (Gr3). This structure, in which at least three zoom units (Gr2 to Gr4) are provided and zooming is performed by varying the distances between the zoom units, allows ample freedom in zooming, and thereby makes it possible to realize a high-zooming-ratio zoom lens system that offers excellent optical performance.

In general, three separate driving mechanisms are required to drive an image blur compensating lens unit, an aperture stop, and a focusing lens unit. For example, in a case where the image blur compensating lens unit and the aperture stop are provided in one zoom unit, it is necessary to arrange two driving mechanisms around one lens holding member. Arranging two driving mechanisms without interference therebetween leads, as described earlier, to an increased size of the entire zoom unit including the driving mechanisms. This spoils compactness of the entire zoom lens system, making the camera as a whole unduly large. In addition, this complicates not only the arrangement of the driving mechanisms themselves, but also the arrangement of the power supply units for them.

To solve this problem of interference between driving mechanisms and similar problems, it is preferable to arrange an image blur compensating lens unit, an aperture stop, and a focusing lens unit in separate zoom units as in the zoom lens systems of the first to third embodiments. This allows the driving mechanisms for the image blur compensating lens unit, the aperture stop, and the focusing lens unit to be arranged in separate zoom units. This helps reduce the size of the zoom units and simplify the design of the driving mechanisms. As a result, it is possible to make the entire zoom lens system including the driving mechanisms compact without interference between the driving mechanisms.

In the first to third embodiments, such a structure is realized by providing the zoom lens system with a first zoom unit (GA) having an aperture stop (S), a second zoom unit (GF) of which the whole (GF) or a part (Gf) is moved along the optical axis to achieve focusing, and a third zoom unit of which the whole (GB) or the part (Gb) is decentered translationally to achieve image blur compensation. Note that, in these embodiments, the third lens unit (Gr3) corresponds to the first zoom unit (GA), the second lens unit (Gr2) corresponds to the second zoom unit (GF), and the fourth lens unit (Gr4) corresponds to the third zoom unit (GB).

Additionally, in these embodiments, the second lens unit (Gr2) corresponding to the second zoom unit (GF) is placed on the object side of the third lens unit (Gr3) corresponding to the first zoom unit (GA), and the fourth lens unit (Gr4) corresponding to the third zoom unit (GB) is placed on the image side of the third lens unit (Gr3) corresponding to the first zoom unit (GA). That is, a focusing lens unit (GF or Gf), an aperture stop (S), and an image blur compensating lens unit (GB or Gb) are arranged in this order from the object side. This structure makes it possible to minimize the size of the image blur compensating lens unit and the focusing lens unit, and to achieve satisfactory image blur compensation over the entire range from the infinite-distance shooting condition to the closest-distance shooting condition. The reasons are as follows.

First, by placing the focusing lens unit (GF or Gf) on the object side of the image blur compensating lens unit (GB or Gb), it is possible to keep constant the object distance with respect to any lens unit placed on the image side of the focusing lens unit (GF or Gf) regardless of focusing. That is, the magnification of the image blur compensating lens unit (GB or Gb) is kept constant regardless of focusing. This helps reduce variations in the aberrations that occur in the image blur compensating lens unit (GB or Gb) and the lens units placed on the object side thereof. Accordingly, the effect of image blur compensation does not vary according to the object distance, and therefore it is possible to achieve satisfactory image blur compensation over the entire range from the infinite-distance shooting condition to the closest-distance shooting condition.

Second, since light beams are dense in the vicinity of the aperture stop (S), by placing the first zoom unit (GA), which includes the aperture stop (S), next to the third zoom unit (GB), which constitutes the image blur compensating lens unit (GB or Gb), it is possible to reduce the diameter of the image blur compensating lens unit (GB or Gb). This helps reduce the weight of the image blur compensating lens unit (GB or Gb) and thus the load to be borne by the driving mechanism for the image blur compensation lens unit. This in turn helps reduce the size of the driving mechanism for the image blur compensating lens unit.

Third, since light beams are dense in the vicinity of the aperture stop (S), by placing the first zoom unit (GA), which includes the aperture stop (S), next to the second zoom unit (GF), which constitutes the focusing lens unit (GF or Gf), it is possible to reduce the diameter of the focusing lens unit (GF or Gf). This helps reduce the weight of the focusing lens unit (GF or Gf) and thus the load to be borne by the driving mechanism for the focusing lens unit. This in turn helps reduce the size of the driving mechanism for the focusing lens unit.

For these reasons, to minimize the size of the image blur compensating lens unit (GB or Gb) and the focusing lens unit (GF or Gf), and to achieve satisfactory image blur compensation over the entire range from the infinite-distance shooting condition to the closest-distance shooting condition, it is preferable, in a zoom lens system, that a focusing lens unit (GF or Gf), an aperture stop (S), and an image blur compensating lens unit (GB or Gb) are arranged in this order from the object side as in the zoom lens systems of the first to third embodiments.

Where image blur compensation is achieved by inclining the image blur compensating lens unit with respect to its optical axis, the driving mechanism for the image blur compensating lens unit needs to have a driving shaft that goes through the center of rotation. As a result, the larger the distance between the center of rotation and the image blur compensating lens unit, the larger the size of the driving mechanism along th e optical axis. In contrast, where image blur compensation is achieved by moving the image blur compensating lens unit (GB or Gb) along a direction perpendicular to the optical axis as in the zoom lens systems of the first to third embodiments, it is possible to make the driving mechanism for the image blur compensating lens unit simple and compact.

Where the image blur compensating lens unit is composed of a single lens element, the number of constituent lens elements is minimal. This makes it possible to minimize the load to be borne by the driving mechanism for the image blur compensating lens unit. However, since it is impossible to correct chromatic aberration properly with a single lens element while the image blur compensating lens unit is decentered, it is impossible to correct the axial lateral chromatic aberration that occurs during decentering. On the other hand, where the image blur compensating lens unit is composed of a plurality of lens elements so that the chromatic aberration occurring therein is corrected properly, the load to be borne by the driving mechanism for the image blur compensating lens unit is unduly heavy. To avoid these inconveniences, it is preferable that the image blur compensating lens unit (GB or Gb) be composed of a single doublet lens element as in the zoom lens systems of the first to third embodiments. This makes it possible to correct the axial lateral chromatic aberration that occurs during image blur compensation and simultaneously minimize the load to be borne by the driving mechanism for the image blur compensating lens unit.

Where, as described above, the image blur compensating lens unit is composed of a single doublet lens element, the axial optical path length of the image blur compensating lens unit is minimal. In this case, even if a focusing lens unit, an image blur compensating lens unit, and an aperture stop are arranged in this order from the object side, the axial optical path length from the focusing lens unit to the aperture stop is only moderately long, and thus the effective diameter of the focusing lens unit is kept small. Accordingly, even where the image blur compensating lens unit is composed of a single doublet lens element, as long as the focusing lens unit, the image blur compensating lens unit, and the aperture stop are provided in separate zoom units, it is possible to achieve the same effect as in the zoom lens systems of the first to third embodiments.

As described heretofore, in the first to third embodiments, the zoom lens system is composed of, from the object side, a first lens unit having a positive optical power (Gr1), a second lens unit having a negative optical power (Gr2), and other lens units (Gr3 . . . ) that are each composed of at least one zoom unit. In this zoom lens system, during zooming from the wide-angle end [W] to the telephoto end [T], both the first and second lens units (Gr1 and Gr2) are moved toward the object side so that the distance between the first and second lens units (Gr1 and Gr2) increases. In this zoom lens system, the lens units (Gr3 . . . ) other than the first and second lens units includes a last lens unit (GR) placed at the image-side end and composed of negatively powered lens units and an image blur compensating lens unit (GB or Gb) placed next to the last lens unit (GR) on the object side thereof and composed of positively powered lens units. In this zoom lens system, image blur compensation is achieved by decentering the image blur compensating lens unit (GB or Gb) in a direction perpendicular to the optical axis. This zoom lens structure having an image blur compensation function (hereafter referred to as "the characteristic zoom lens structure") is suitable for use in single-lens reflex cameras, and has various advantages as described below.

In the characteristic zoom lens structure described above, the distance between the first and second lens units (Gr1 and Gr2) is minimal at the wide-angle end [W]. That is, the entire zoom lens system exhibits a retrofocus-type power distribution at the wide-angle end [W]. Thus, it is possible to secure a sufficient back focal length. In contrast, the distance between the first and second lens units (Gr1 and Gr2) is maximal at the telephoto end [T]. That is, the entire zoom lens system exhibits a telephoto-type power distribution at the telephoto end [T]. Thus, it is possible to reduce the total length of the zoom lens system at the telephoto end [T]. In addition, since the first lens unit (Gr1) is not kept in a fixed position during zooming as in video zooming, that is, both the first and second lens units (Gr1 and Gr2) are moved toward the object side during zooming from the wide-angle end [W] to the telephoto end [T], it is possible to reduce the total length of the entire zoom lens system at the wide-angle end [W].

In the characteristic zoom lens structure described above, it is preferable that at least one of Conditions (1) to (3) described below be fulfilled. Conditions (1) and (2) define the conditions to be fulfilled to keep the optical powers of the first and second lens units (Gr1 and Gr2) in appropriate ranges, and Condition (3) defines the condition to be fulfilled to keep the back focal length in an appropriate range.

$$1.5 < f1/fW < 6.0 \qquad (1)$$

$$-1.0 < f2/fW < -0.20 \qquad (2)$$

$$0.85 < LBW/Ymax < 2.5 \qquad (3)$$

where f1 represents the focal length of the first lens unit (Gr1);

f2 represents the focal length of the second lens unit (Gr2);

fW represents the focal length of the entire zoom lens system at the wide-angle end [W];

LBW represents the back focal length at the wide-angle end [W]; and

Ymax represents half the diagonal length of the image screen.

If the upper limit of Condition (1) is exceeded, the optical power of the first lens unit (Gr1) is too weak. This makes the telephoto-type power distribution at the telephoto end [T] less significant, and thus makes the total length of the zoom lens system unduly large at the telephoto end [T]. In contrast, if the lower limit of Condition (1) is exceeded, whereas the total length of the zoom lens system at the telephoto end [T] can be effectively reduced, the diameter of the first lens unit (Gr1) needs to be increased in order to secure sufficient off-axial light beams at the wide-angle end [W], and in addition the optical power of the first lens unit (Gr1) becomes so strong that it is difficult to correct aberrations properly.

If the upper limit of Condition (2) is exceeded, the optical power of the second lens unit (Gr2) is too weak. As a result, the diameter of the first lens unit (Gr1) needs to be increased in order to secure sufficient off-axial light beams at the wide-angle end [W]. Moreover, the retrofocus-type power distribution at the wide-angle end [W] becomes so insignificant that it is difficult to secure a sufficient back focal length. In contrast, if the lower limit of Condition (2) is exceeded, the Petzval sum becomes excessively great in the negative direction, and this makes it difficult to correct astigmatism and curvature of field properly. Moreover, the telephoto-type power distribution at the telephoto end [T] becomes so insignificant that the total length of the zoom lens system becomes unduly large at the telephoto end [T].

If the upper limit of Condition (3) is exceeded, the back focal length becomes too large, with the result that the total length of the zoom lens system becomes unduly large. In contrast, if the lower limit of Condition (3) is exceeded, the back focal length becomes too small, and this makes it difficult to dispose a TTL (i.e. through the taking lens) mirror.

Within the range defined by Condition (1), it is more preferable that Condition (1') below be fulfilled. Fulfillment of Condition (1') makes it possible to obtain higher optical performance.

$$2.5 < f1/fW < 6.0 \qquad (1')$$

Within the range defined by Condition (3), it is more preferable that Condition (3') below be fulfilled. Fulfillment of Condition (3') makes it possible to realize a more compact zoom lens system.

$$0.85 < LBW/Ymax < 1.35 \quad (3')$$

In general, in a zoom lens system for a single-lens reflex camera, lens elements are so arranged that those closer to the image-side end are smaller in diameter, and thus in weight, than those closer to the object-side end. To perform image blur compensation, the image blur compensating lens unit needs to be driven by a driving mechanism dedicated thereto. To reduce the load to be borne by this driving mechanism, it is essential to reduce the size and weight of the image blur compensating lens unit. For this reason, it is preferable to use a lens unit disposed as close as possible to the image-side end as the image blur compensating lens unit. In the zoom lens systems of the first to third embodiments, the lens unit placed immediately on the object side of the last lens unit (GR) is used as the image blur compensating lens unit (GB or Gb). This helps reduce the load to be borne by the driving mechanism for the image blur compensating lens unit, and thus makes it possible to reduce the size of the driving mechanism for the image blur compensating lens unit. Moreover, since, as described above, a zoom lens system for a single-lens reflex camera generally has smaller lens elements disposed closer to the image-side end, it is more preferable to use, as in the zoom lens systems of the first to third embodiments, the second lens unit (Gr2) as the focusing lens unit than to use the first lens unit (Gr1), because this helps reduce the load to be borne by the driving mechanism for the focusing lens unit.

One type of aberration that occurs during image blur compensation is the off-axial image-point movement error. This aberration indicates the degree of over- or undercorrection of off-axial image-points that remains even when axial image-points are corrected properly by the decentering of the image blur compensating lens unit. This aberration depends principally on the distortion occurring in the focusing lens unit (GF or Gf) disposed on the object side of the image blur compensating lens unit (GB or Gb), and on the distortion occurring in the image blur compensating lens unit (GB or Gb). Accordingly, by limiting the distortion occurring in the image blur compensating lens unit (GB or Gb) within an appropriate range, it is possible to reduce the off-axial image-point movement error. Furthermore, since the distortion occurring over the entire zoom lens system is properly corrected, it is possible, by reducing the total distortion occurring in the focusing lens unit (GF or Gf), in the image blur compensating lens unit (GB or Gb), and in the last lens unit (GR), to reduce the off-axial image-point movement error. From this point of view, it is preferable that at least one of Conditions (4) and (5) below be fulfilled.

$$-1.5 < fB/fR < -0.3 \quad (4)$$

$$0.8 < fB/fW < 4.0 \quad (5)$$

where
fB represents the focal length of the image blur compensating lens unit (GB or Gb);
fR represents the focal length of the last lens unit (GR); and
fW represents the focal length of the entire zoom lens system at the wide-angle end [W].

Condition (4) defines the condition to be fulfilled to keep the ratio of the optical power of the last lens unit (GR) to that of the image blur compensating lens unit (GB or Gb) in an appropriate range. If the upper limit of Condition (4) is exceeded, the optical power of the image blur compensating lens unit (GB or Gb) is too weak as compared with that of the last lens unit (GR), with the result that too little aberration is left to be corrected by the image blur compensating lens unit (GB or Gb). Thus, it is impossible to obtain an appropriate distortion coefficient in the image blur compensating lens unit (GB or Gb) that is said to be required to cancel out the off-axial image-point movement error occurring during image blur compensation. In contrast, if the lower limit of Condition (4) is exceeded, the optical power of the image blur compensating lens unit (GB or Gb) is too strong as compared with that of the last lens unit (GR), with the result that excessively large distortion occurs in the image blur compensating lens unit (GB or Gb). As a result, the amount of distortion that the last lens unit (GR) needs to correct to reduce the distortion over the entire zoom lens system becomes too small, which makes it impossible to correct the distortion over the entire zoom lens system properly.

Condition (5) defines the condition to be fulfilled to keep the optical power of the image blur compensating lens unit (GB or Gb) in an appropriate range. If the upper limit of Condition (5) is exceeded, the optical power of the image blur compensating lens unit (GB or Gb) is too weak, with the result that image-blur-compensation sensitivity is too low. This makes it necessary to increase the movement stroke through which the image blur compensating lens unit (GB or Gb) is decentered and thus increase the diameter of the image blur compensating lens unit (GB or Gb). In contrast, If the lower limit of Condition (5) is exceeded, the optical power of the image blur compensating lens unit (GB or Gb) is too strong, with the result that that image-blur-compensation sensitivity is too high. In this case, it is possible to reduce the movement stroke through which the image blur compensating lens unit (GB or Gb) is decentered, and therefore it is not necessary to increase the diameter of the image blur compensating lens unit (GB or Gb). However, it is necessary to increase the positioning accuracy with which the image blur compensating lens unit (GB or Gb) is decentered, and this may require positioning accuracy that exceeds the performance limit of the detection system used, or incur an increase in the manufacturing cost.

Within the range defined by Condition (5), it is more preferable that Condition (5') below be fulfilled. Fulfillment of Condition (5') makes it possible to realize a zoom lens system that provides higher positioning accuracy.

$$1.0 < fB/fW < 4.0 \quad (5')$$

Note that, in the zoom lens systems of the first to third embodiments, the zoom units are composed solely of refracting lens elements that deflect incoming rays through refraction. However, the zoom units may include, for example, diffracting lens elements that deflect incoming rays through diffraction, refracting-diffracting hybrid-type lens elements that deflect incoming rays through the combined effect of refraction and diffraction, or the like.

Hereinafter, examples of zoom lens systems having an image blur compensation function according to the present invention will be presented with reference to their construction data, graphic representations of aberrations, and other data. Tables 1 to 3 show the construction data of the first to third embodiments, respectively. In the construction data of each embodiment, ri (i=1, 2, 3, . . . ) represents the radius of curvature of the ith surface counted from the object side, and di (i=1, 2, 3, . . . ) represents the ith axial distance counted from the object side (before decentering). For each of the axial distances that vary with zooming (i.e. variable axial distances), three values are listed that represent, from left, the actual surface-to-surface distance between the relevant lens units at the wide-angle end [W], the same distance at the middle focal length (M), and the same distance at the telephoto end [T]. Ni (i=1, 2, 3, . . . ) and vi (i=1, 2, 3, . . . ) represent the refractive index (Nd) and the Abbe number (vd), respectively, for the d-line of the ith lens element counted from the object side. Also listed together with the construction data are the focal lengths f and the F numbers FNO of the entire zoom lens system at the wide-angle end [W], at the middle focal length (M), and at the telephoto end [T].

Furthermore, a surface whose radius of curvature ri is marked with an asterisk (*) is an aspherical surface, whose surface shape is defined by Formula (AS) below. The data of the aspherical surfaces are also listed together with the construction data, and Table 4 lists the values corresponding to Conditions noted above as observed in each embodiment.

$$X = (C \cdot Y^2) / \left\{ 1 + \sqrt{(1 - \varepsilon \cdot Y^2 \cdot C^2)} \right\} + \sum (Ai \cdot Y^i) \quad \text{(AS)}$$

where

X represents the displacement from the reference surface along the optical axis:

Y represents the height in a direction perpendicular to the optical axis;

C represents the paraxial curvature;

ε represents the quadric surface parameter; and

Ai represents the aspherical coefficient of the ith order.

FIGS. 2A to 2I, 3A to 3I, 9A to 9I, 10A to 10I, 16A to 16I, and 17A to 17I are graphic representations of the aberrations observed in the embodiments before decentering (i.e. in the normal state). Of these, FIGS. 2A to 2I, 9A to 9I, and 16A to 16I are graphic representations of the longitudinal aberrations observed before decentering (i.e. in the normal state) in the infinite-distance shooting condition in the first to third embodiments. FIGS. 3A to 3I, 10A to 10I, and 17A to 17I are graphic representations of the longitudinal aberrations observed before decentering in the closest-distance shooting condition (the object distance=1 m) in the first to third embodiments.

FIGS. 2A to 2C, 3A to 3C, 9A to 9C, 10A to 10C, 16A to 16C, and 17A to 17C graphic representations of the aberrations observed at the wide-angle end [W] in the normal state. FIGS. 2D to 2F, 3D to 3F, 9D to 9F, 10D to 10F, 16D to 16F, and 17D to 17F are graphic representations of the aberrations observed at the middle focal length (M) in the normal state. FIGS. 2G to 2I, 3G to 3I, 9G to 9I, 10G to 10I, 16G to 16I, and 17G to 17I are graphic representations of the aberrations observed at the telephoto end [T] in the normal state.

Figure 2A:
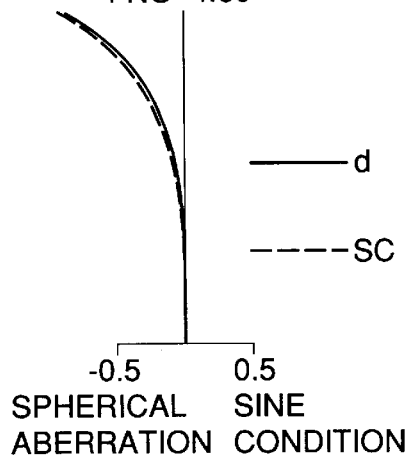
FIGS. 2A to 2I are graphic representations of the longitudinal aberrations observed before decentering in an infinite-distance shooting condition in the first embodiment.
Figure 2B:
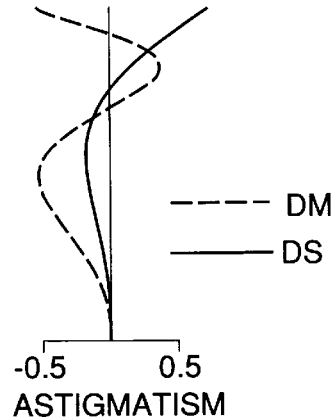
Figure 2C:
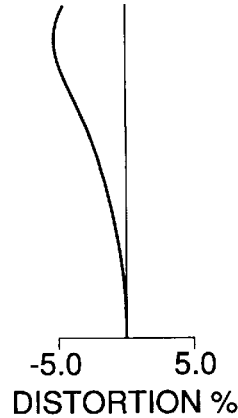
Figure 2D:
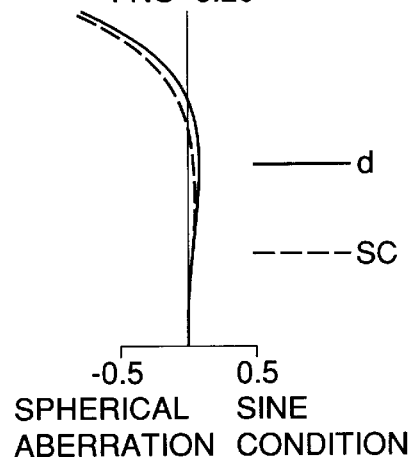
Figure 2E:
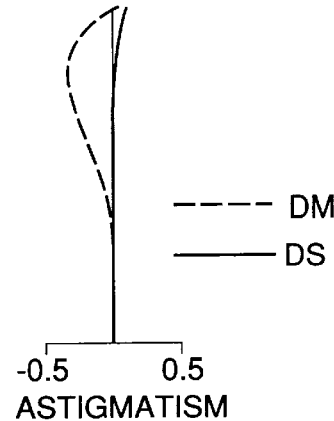
Figure 2F:
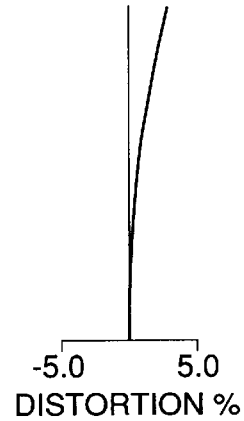
Figure 2G:
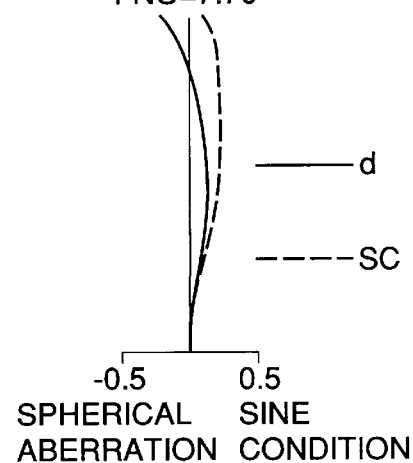
Figure 2H:
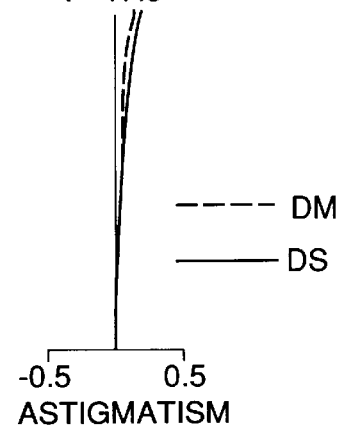
Figure 2I:
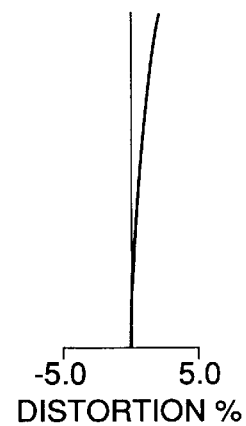
Figure 3A:
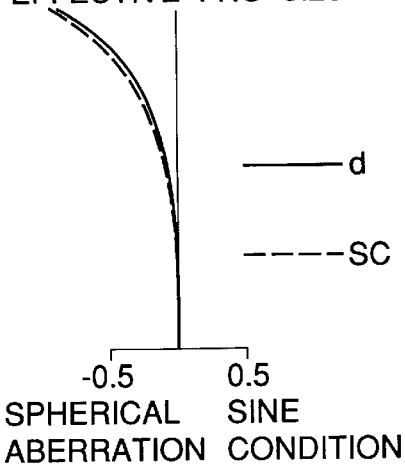
FIGS. 3A to 3I are graphic representations of the longitudinal aberrations observed before decentering in a closest-distance shooting condition in the first embodiment.
Figure 3B:
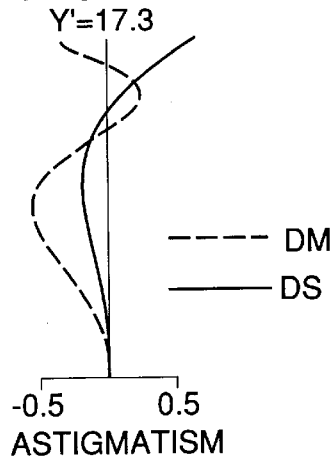
Figure 3C:
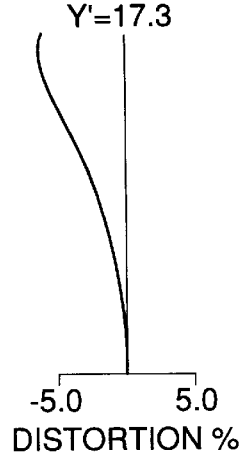
Figure 3D:
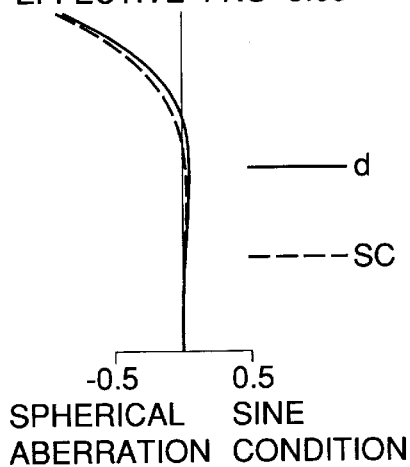
Figure 3E:
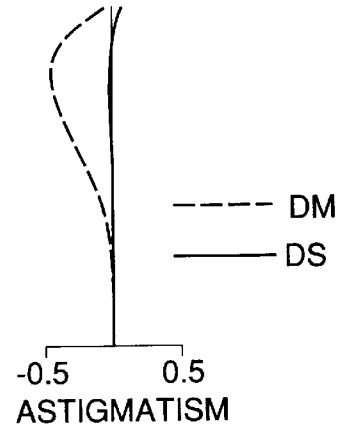
Figure 3F:
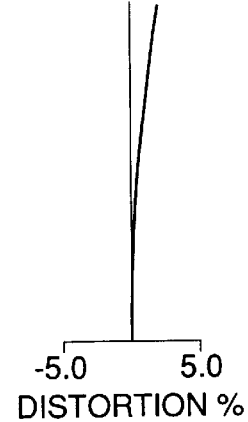
Figure 3G:
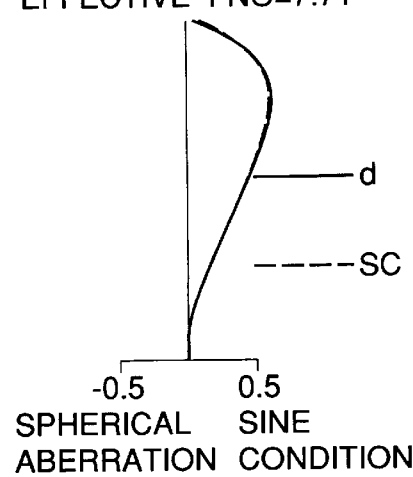
Figure 3H:
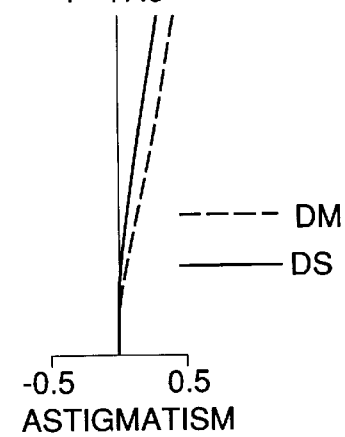
Figure 3I:
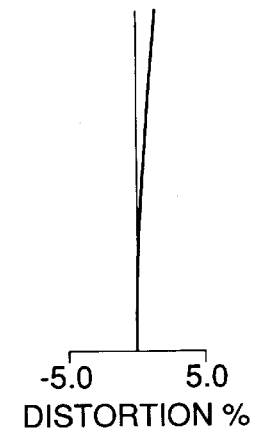
Figure 4A:
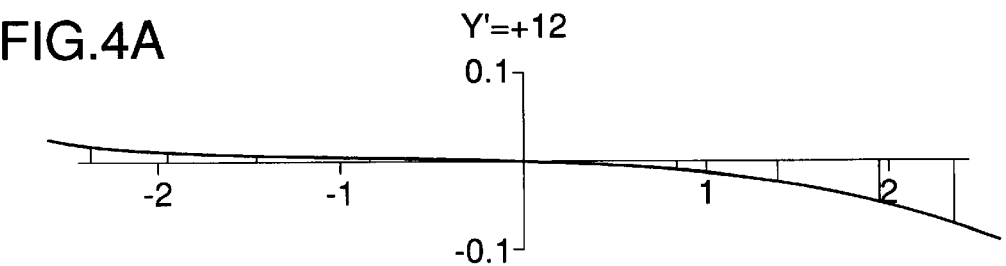
FIGS. 4A to 4E are graphic representations of the meridional lateral aberrations observed before and after decentering at the wide-angle end in an infinite-distance shooting condition in the first embodiment.
Figure 4B:
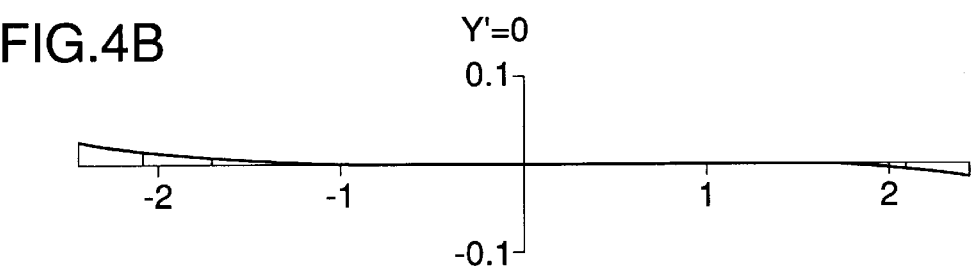
Figure 4C:
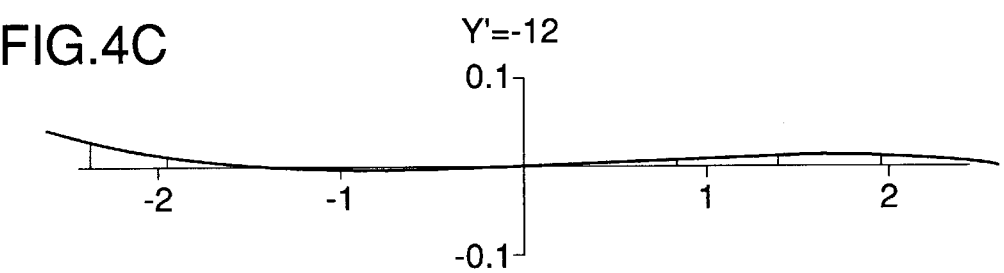
Figure 4D:
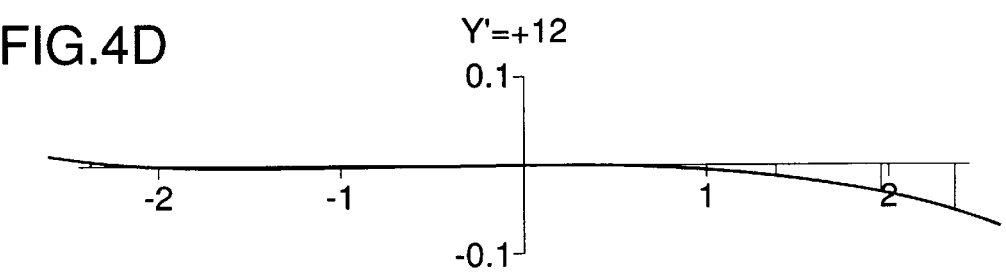
Figure 4E:
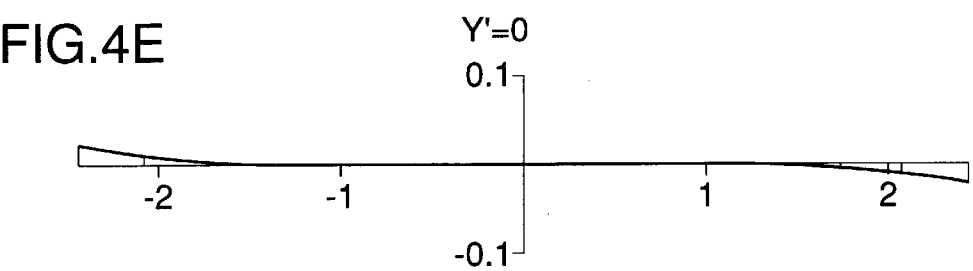
Figure 5A:
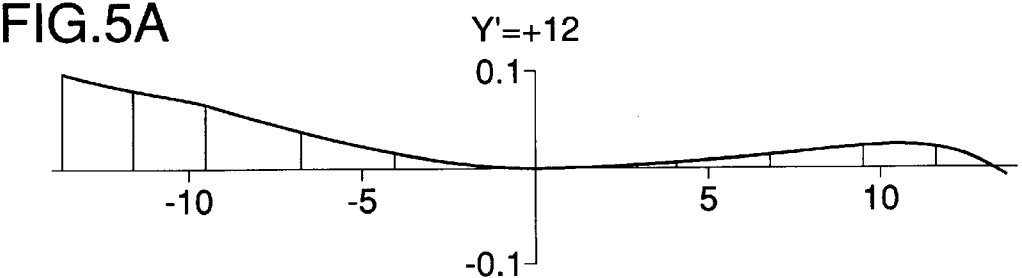
FIGS. 5A to 5E are graphic representations of the meridional lateral aberrations observed before and after decentering at the telephoto end in an infinite-distance shooting condition in the first embodiment.
Figure 5B:
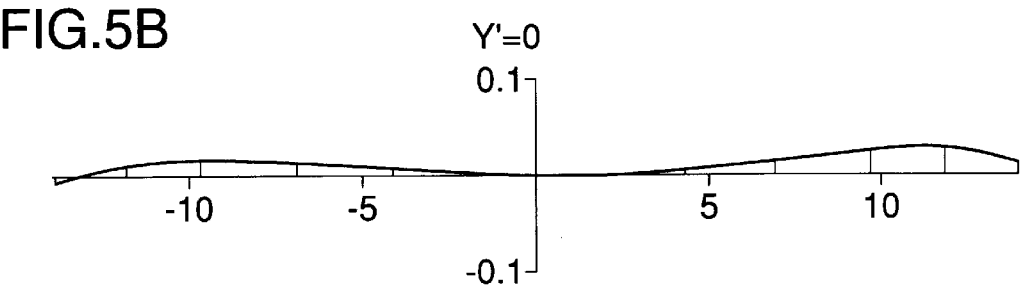
Figure 5C:
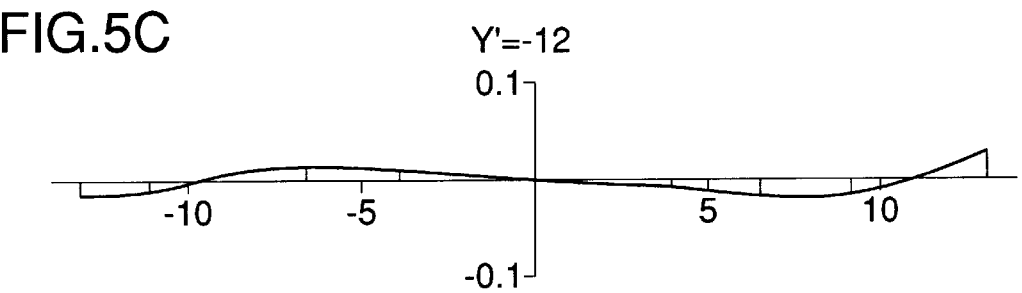
Figure 5D:
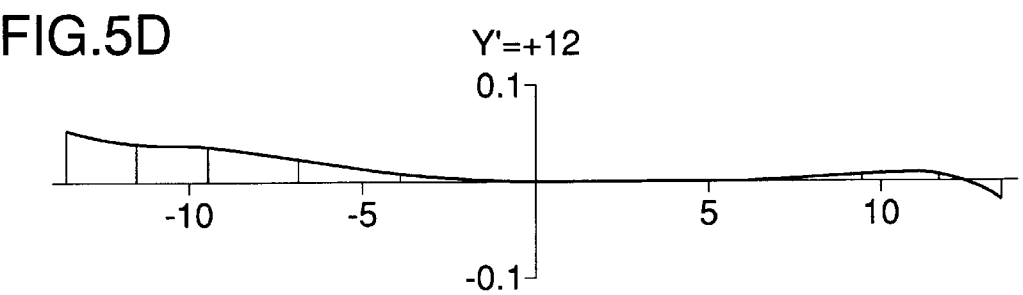
Figure 5E:
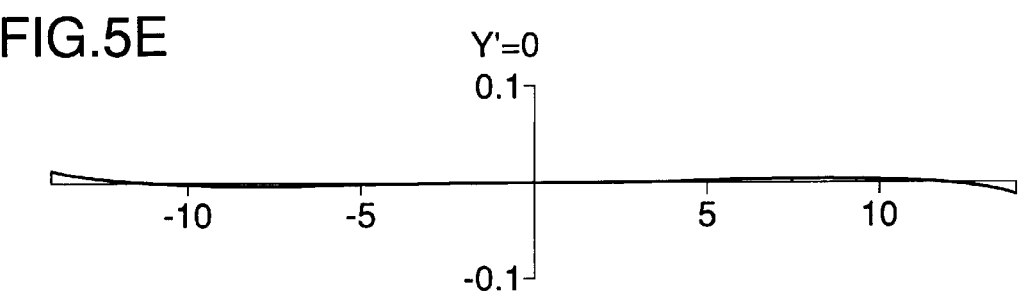
Figure 6A:
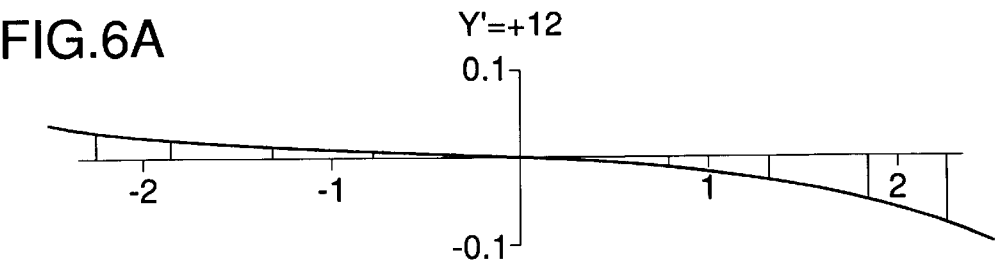
FIGS. 6A to 6E are graphic representations of the meridional lateral aberrations observed before and after decentering at the wide-angle end in a closest-distance shooting condition in the first embodiment.
Figure 6B:
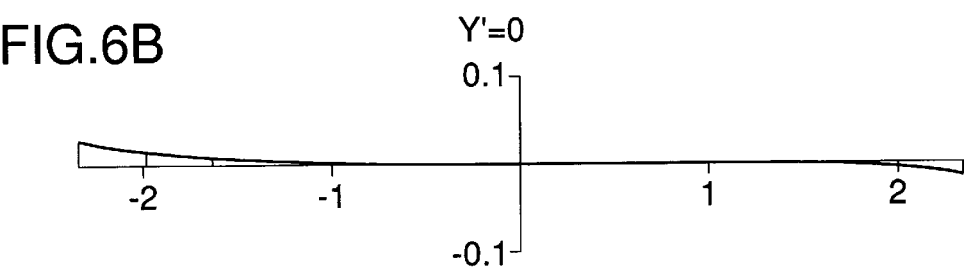
Figure 6C:
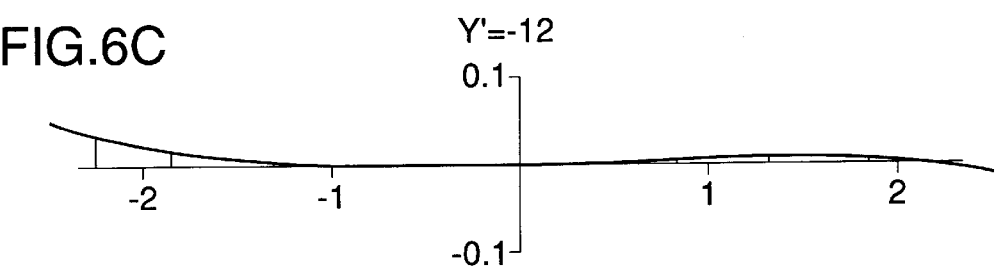
Figure 6D:
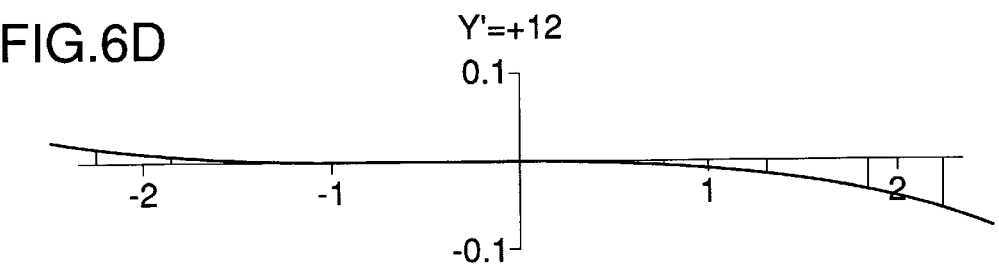
Figure 6E:
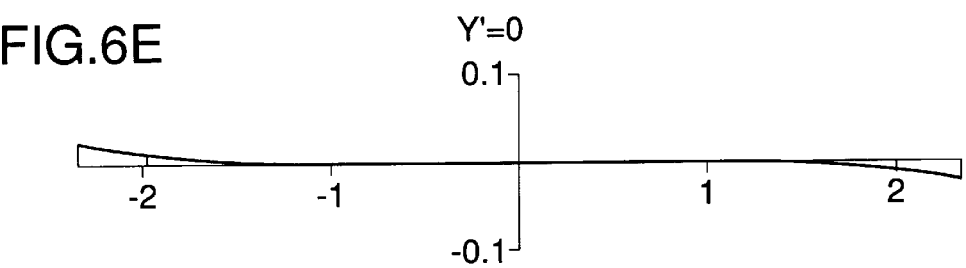
Figure 7A:
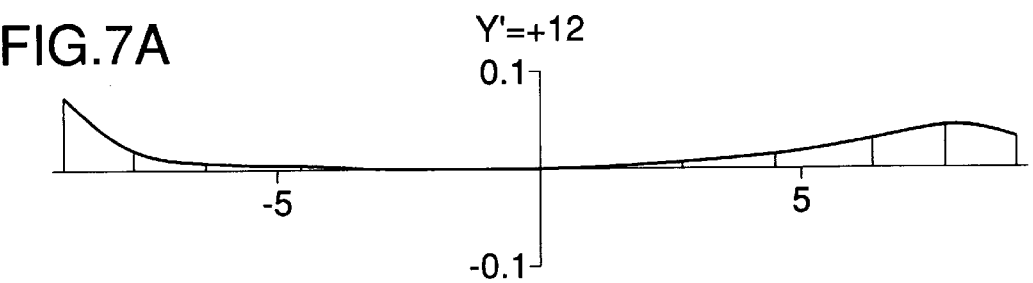
FIGS. 7A to 7E are graphic representations of the meridional lateral aberrations observed before and after decentering at the telephoto end in a closest-distance shooting condition in the first embodiment.
Figure 7B:
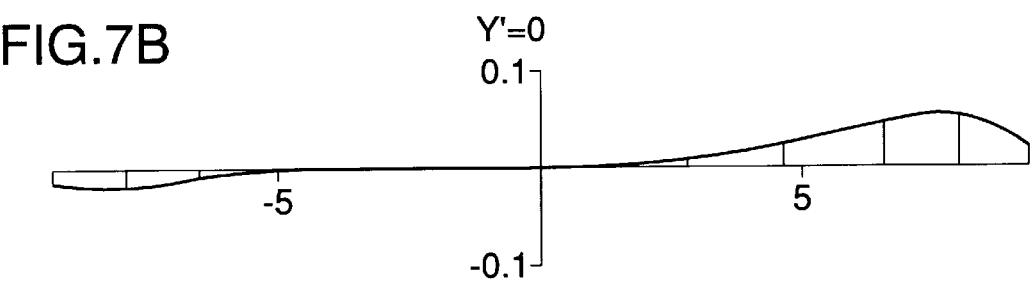
Figure 7C:
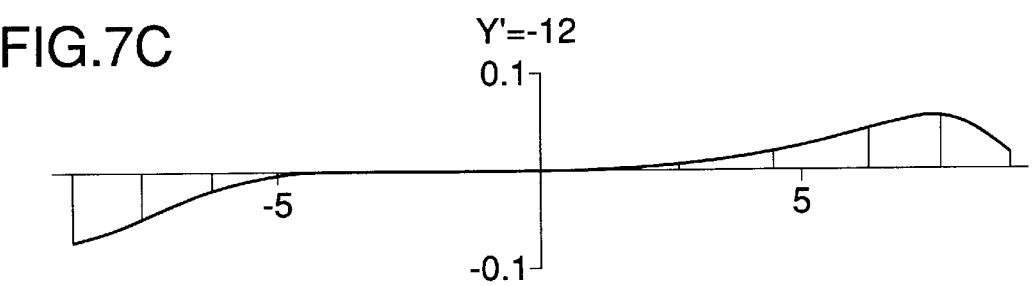
Figure 7D:
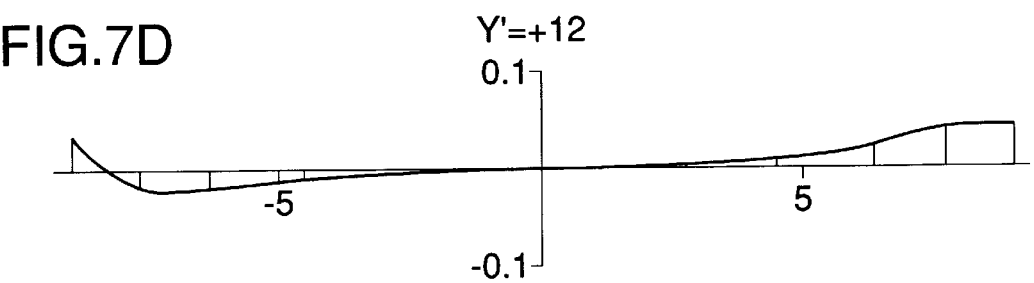
Figure 7E:
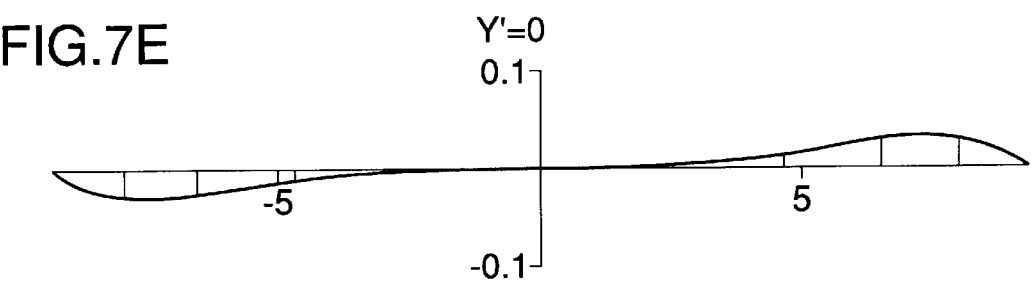
Figure 9A:
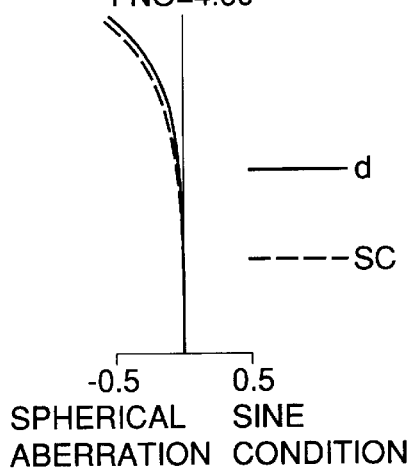
FIGS. 9A to 9I are graphic representations of the longitudinal aberrations observed before decentering in an infinite-distance shooting condition in the second embodiment.
Figure 9B:
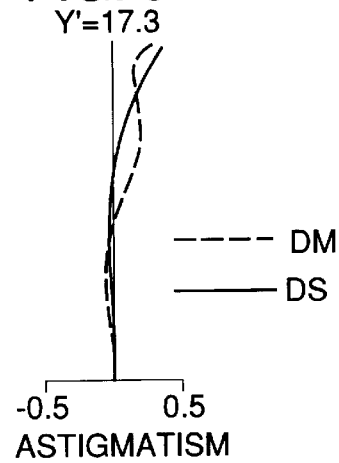
Figure 9C:
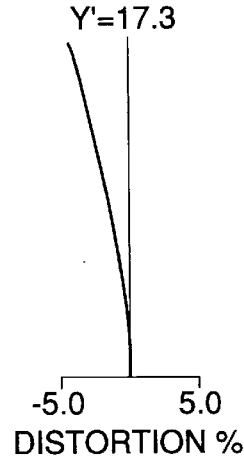
Figure 9D:
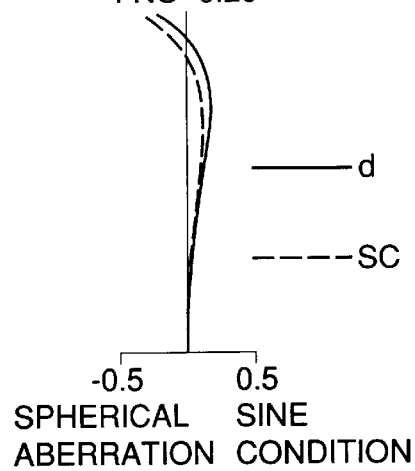
Figure 9E:
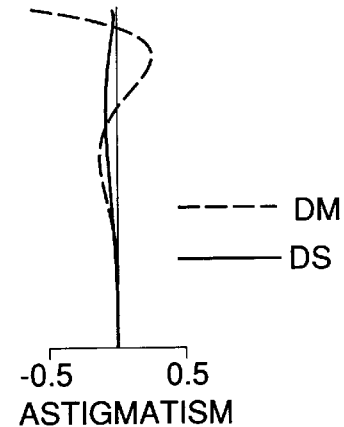
Figure 9F:
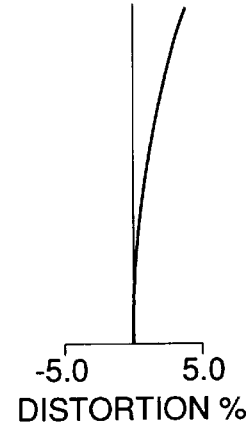
Figure 9G:
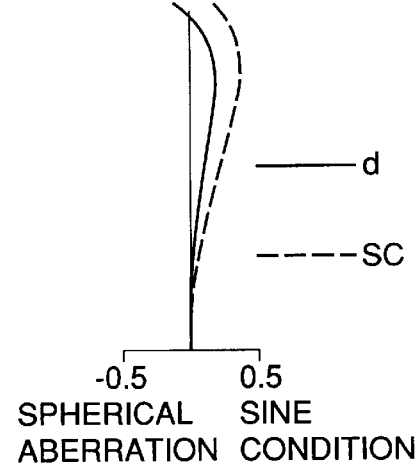
Figure 9H:
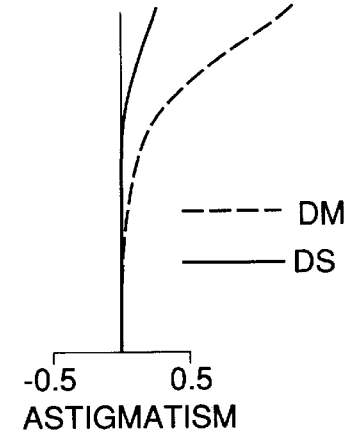
Figure 9I:
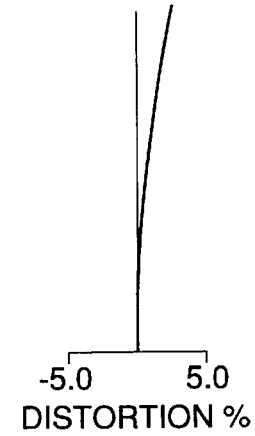
Figure 10A:
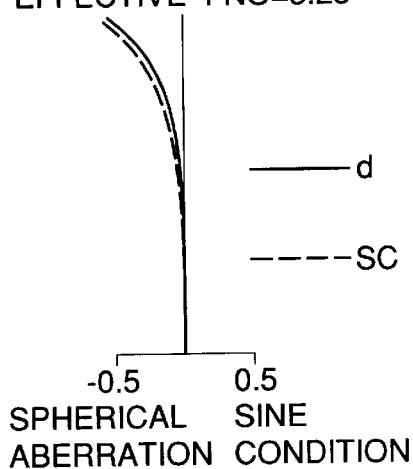
FIGS. 10A to 10I are graphic representations of the longitudinal aberrations observed before decentering in a closest-distance shooting condition in the second embodiment.
Figure 10B:
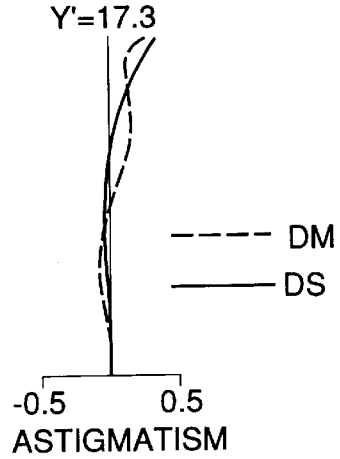
Figure 10C:
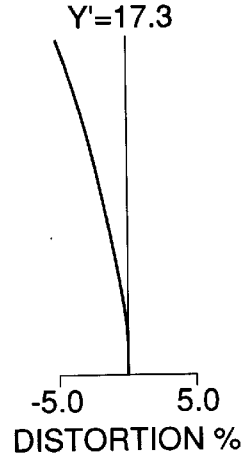
Figure 10D:
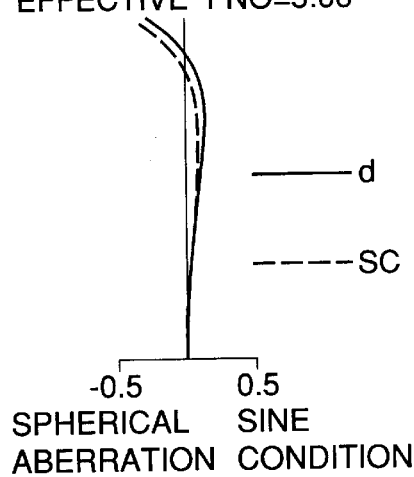
Figure 10E:
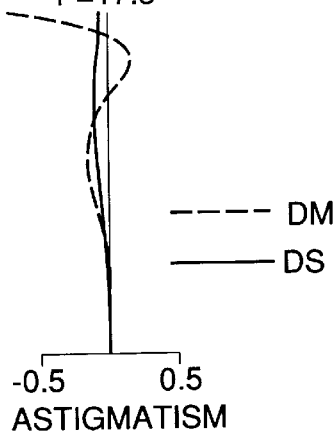
Figure 10F:
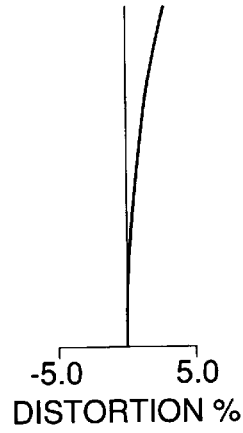
Figure 10G:
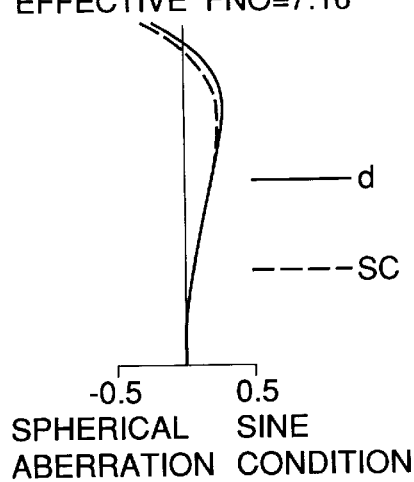
Figure 10H:
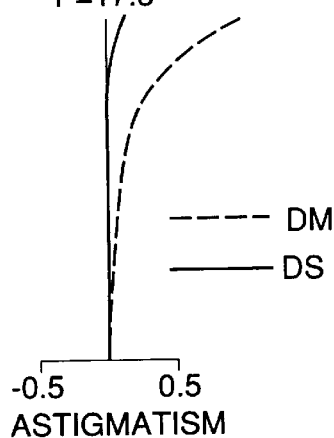
Figure 10I:
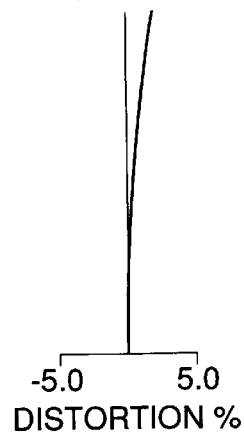
Figure 11A:
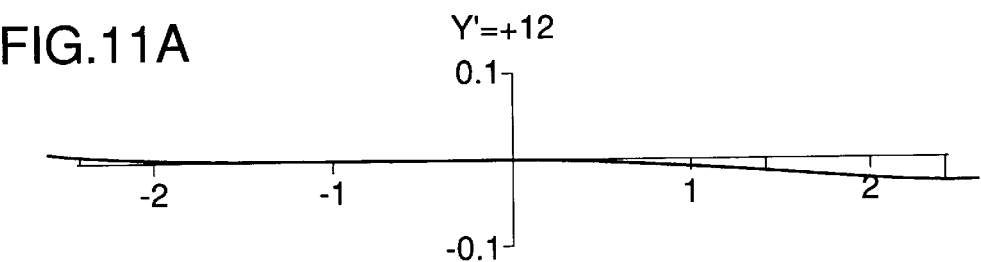
FIGS. 11A to 11E are graphic representations of the meridional lateral aberrations observed before and after decentering at the wide-angle end in an infinite-distance shooting condition in the second embodiment.
Figure 11B:
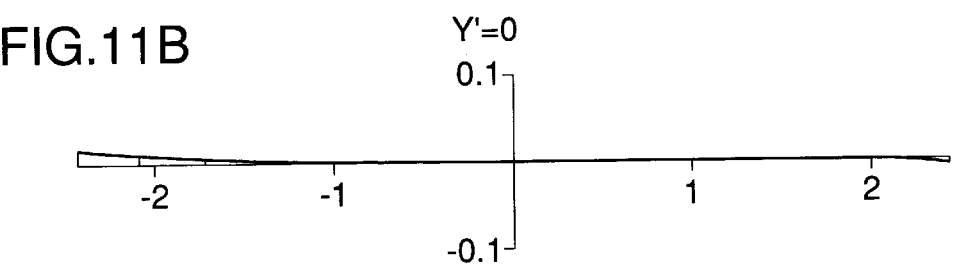
Figure 11C:
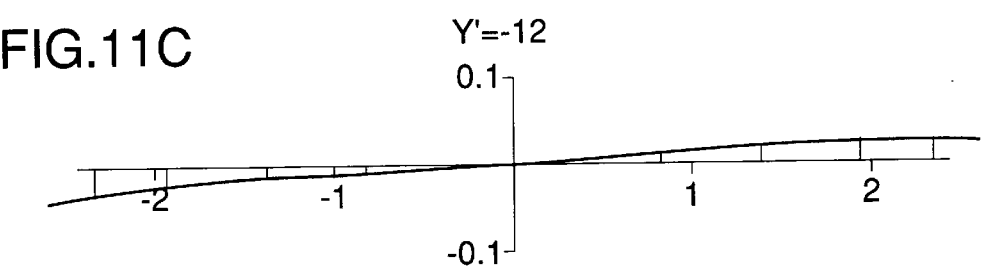
Figure 11D:
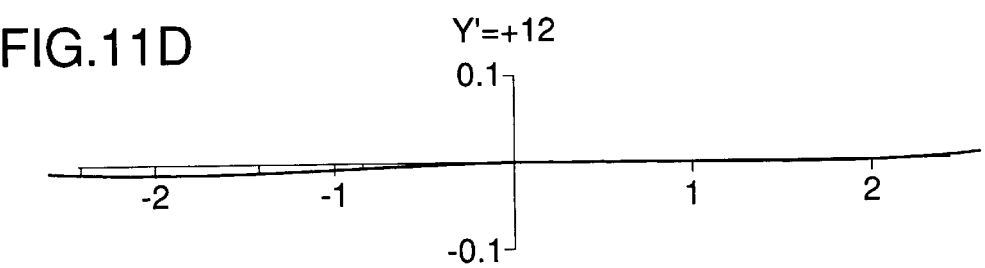
Figure 11E:
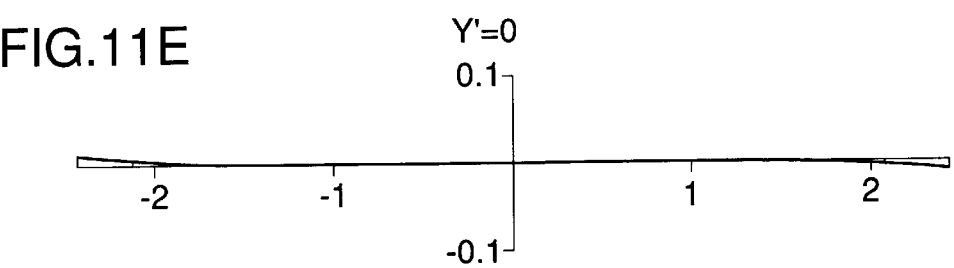
Figure 12A:
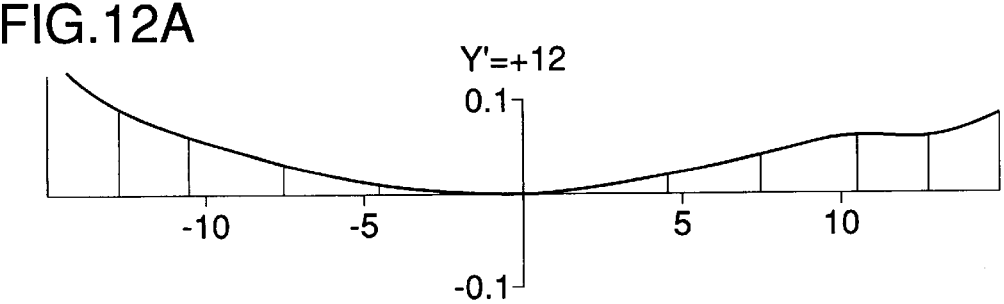
FIGS. 12A to 12E are graphic representations of the meridional lateral aberrations observed before and after decentering at the telephoto end in an infinite-distance shooting condition in the second embodiment.
Figure 12B:
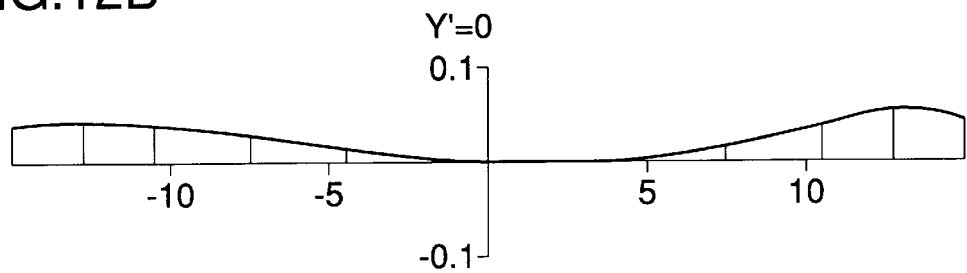
Figure 12C:
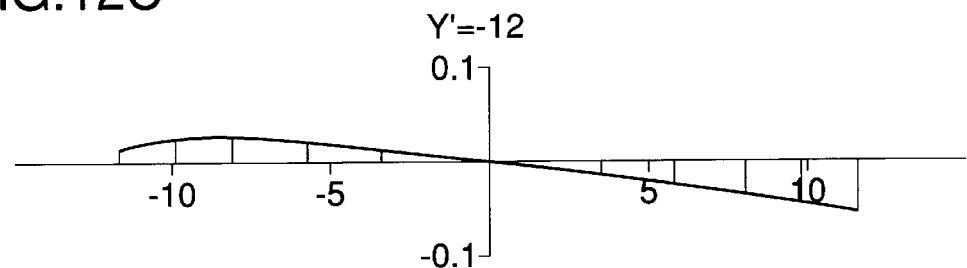
Figure 12D:
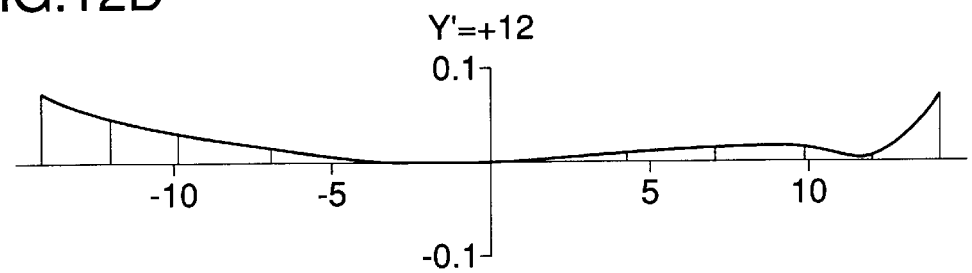
Figure 12E:
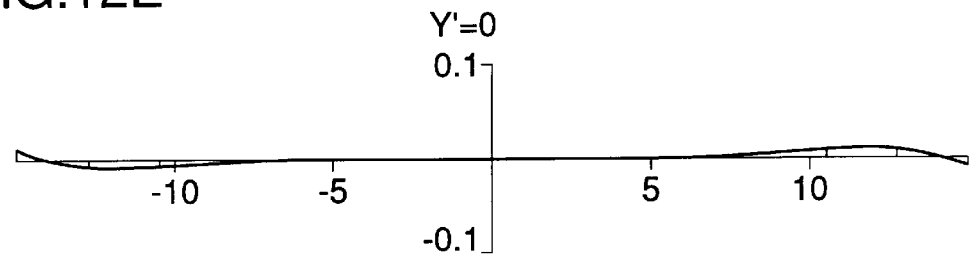
Figure 13A:
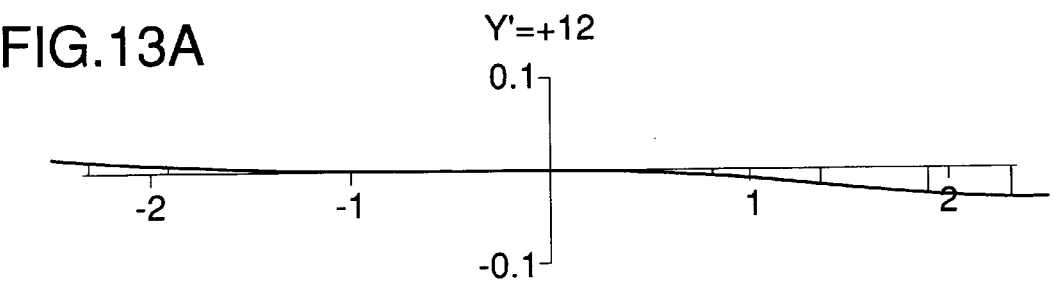
FIGS. 13A to 13E are graphic representations of the meridional lateral aberrations observed before and after decentering at the wide-angle end in a closest-distance shooting condition in the second embodiment.
Figure 13B:
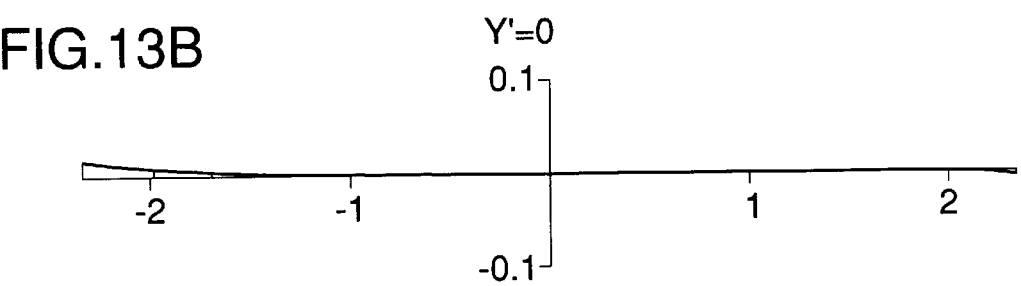
Figure 13C:
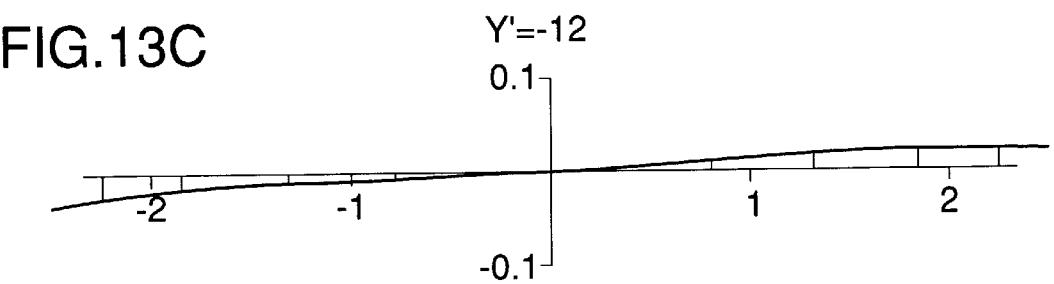
Figure 13D:
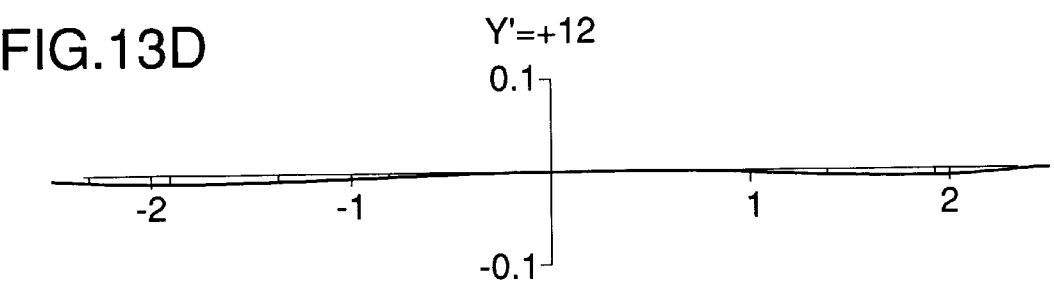
Figure 13E:
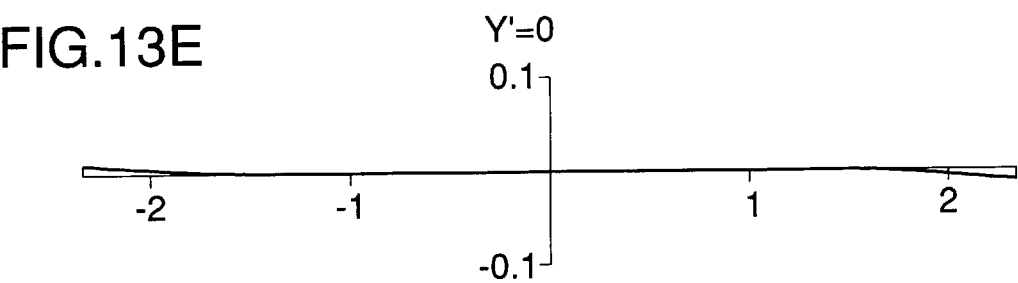
Figure 14A:
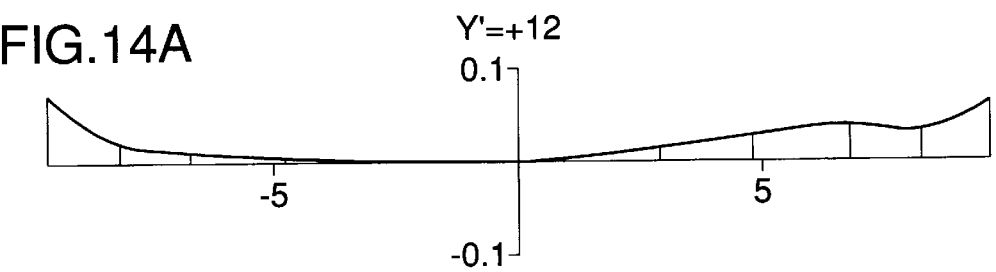
FIGS. 14A to 14E are graphic representations of the meridional lateral aberrations observed before and after decentering at the telephoto end in a closest-distance shooting condition in the second embodiment.
Figure 14B:
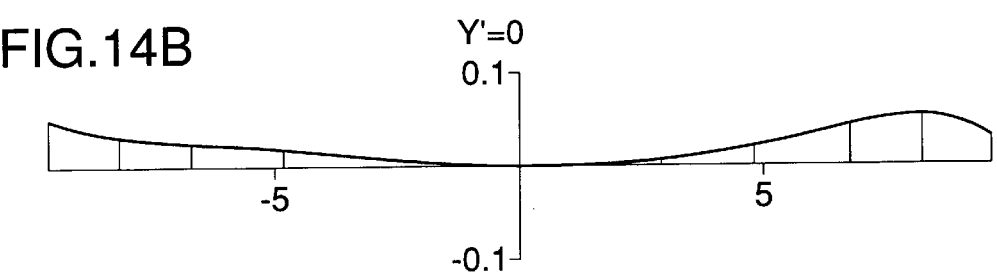
Figure 14C:
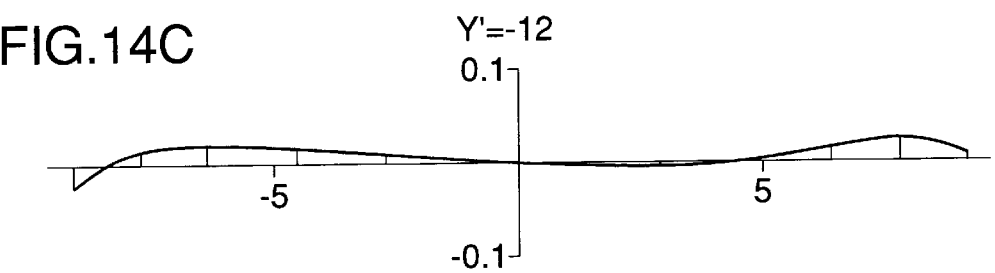
Figure 14D:
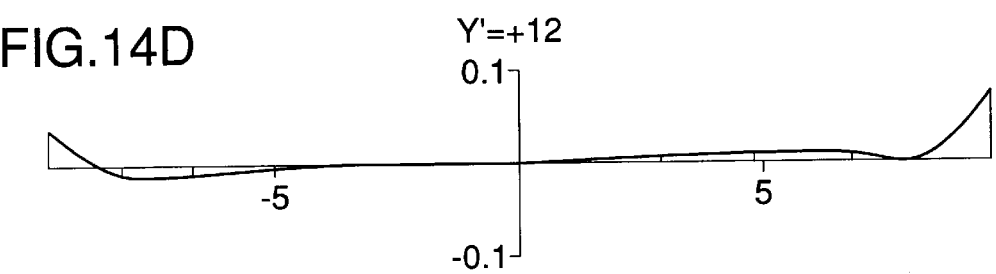
Figure 14E:
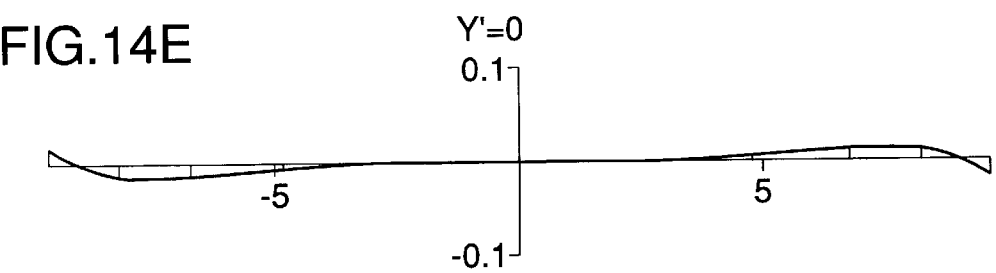
Figure 16A:
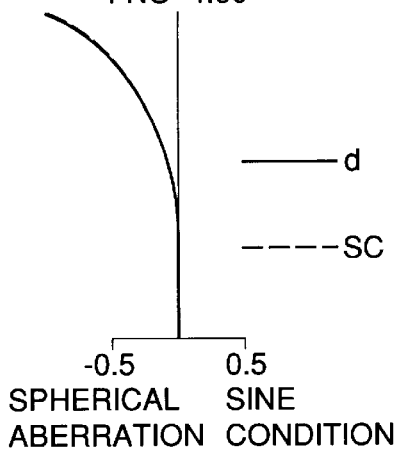
FIGS. 16A to 16I are graphic representations of the longitudinal aberrations observed before decentering in an infinite-distance shooting condition in the third embodiment.
Figure 16B:
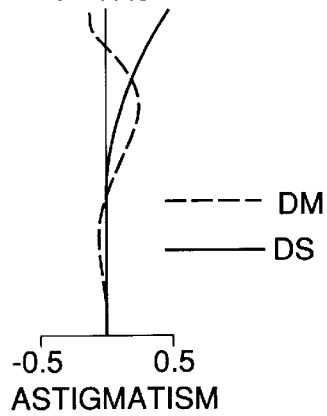
Figure 16C:
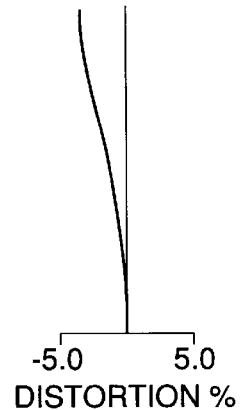
Figure 16D:
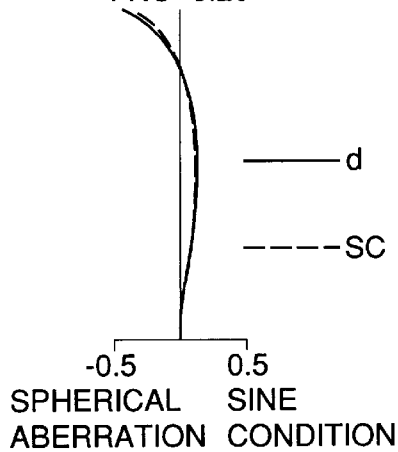
Figure 16E:
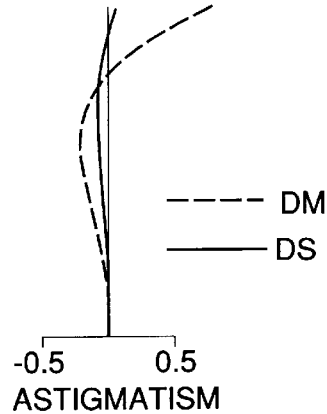
Figure 16F:
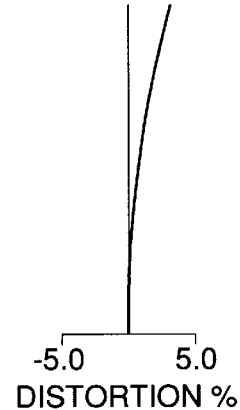
Figure 16G:
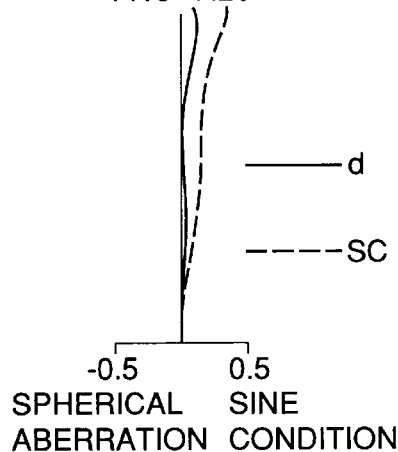
Figure 16H:
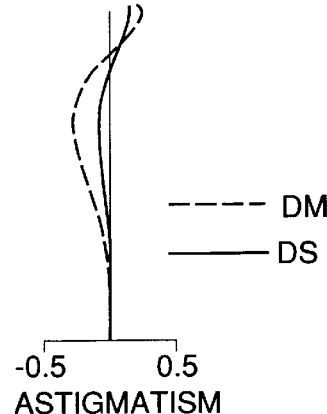
Figure 16I:
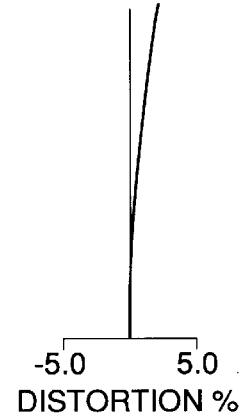
Figure 17A:
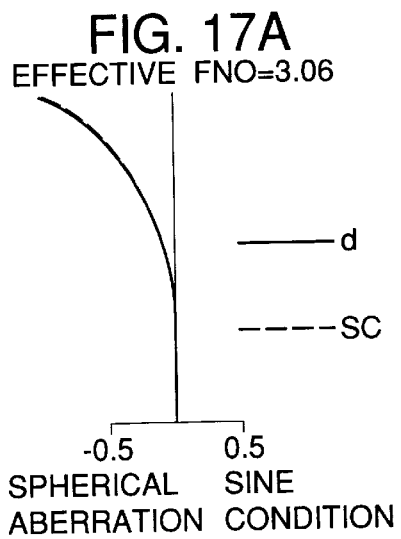
FIGS. 17A to 17I are graphic representations of the longitudinal aberrations observed before decentering in a closest-distance shooting condition in the third embodiment.
Figure 17B:
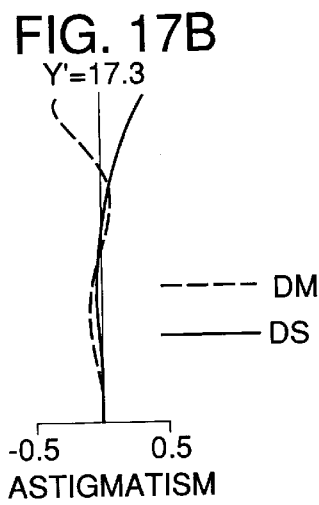
Figure 17C:
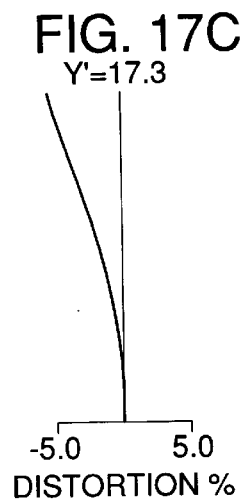
Figure 17D:
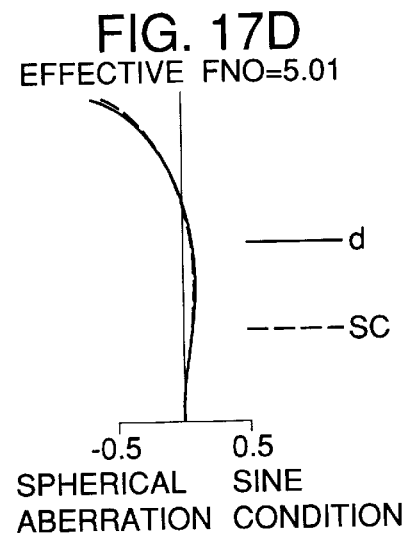
Figure 17E:
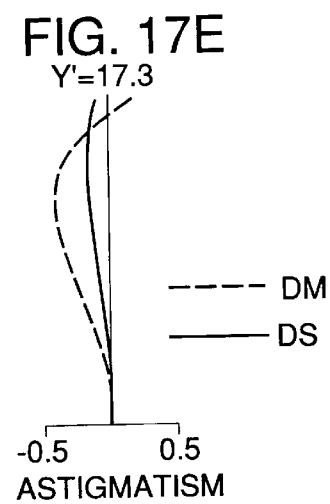
Figure 17F:
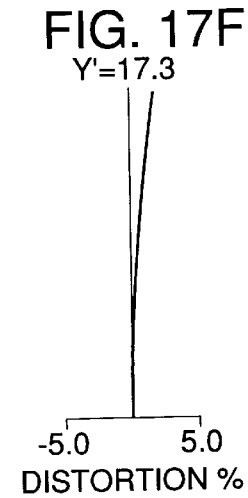
Figure 17G:
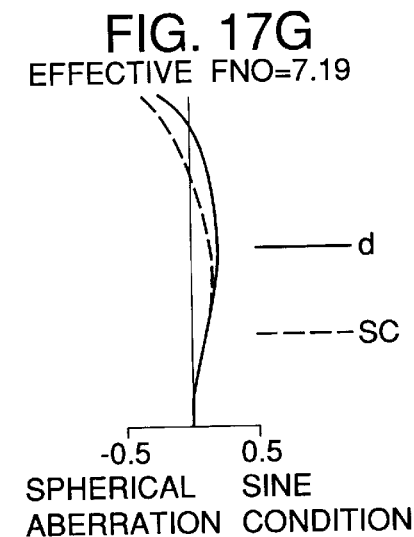
Figure 17H:
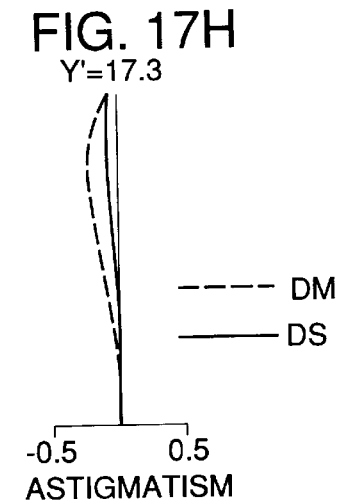
Figure 17I:
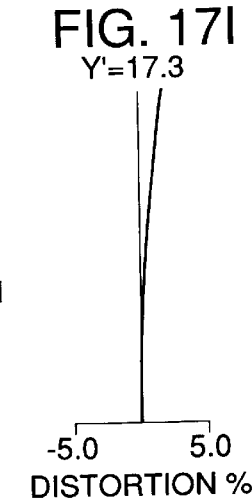
Figure 18A:
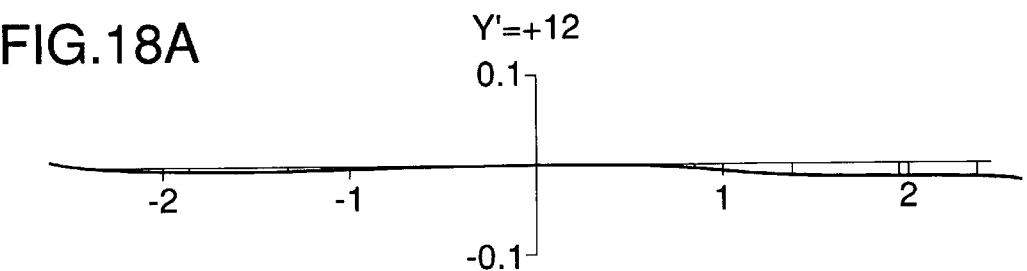
FIGS. 18A to 18E are graphic representations of the meridional lateral aberrations observed before and after decentering at the wide-angle end in an infinite-distance shooting condition in the third embodiment.
Figure 18B:
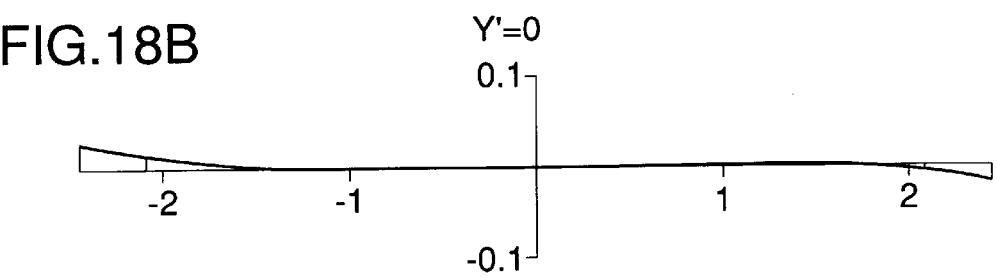
Figure 18C:
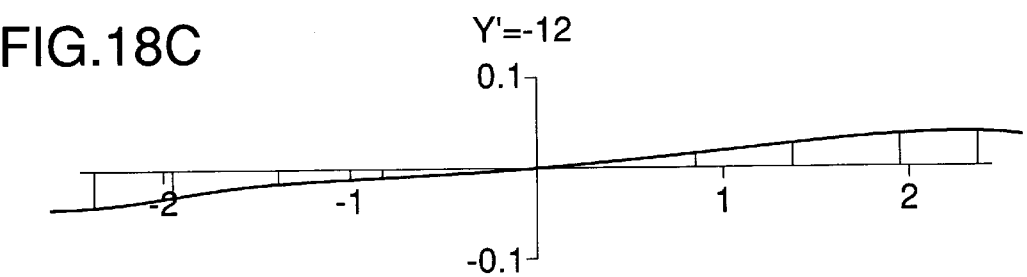
Figure 18D:
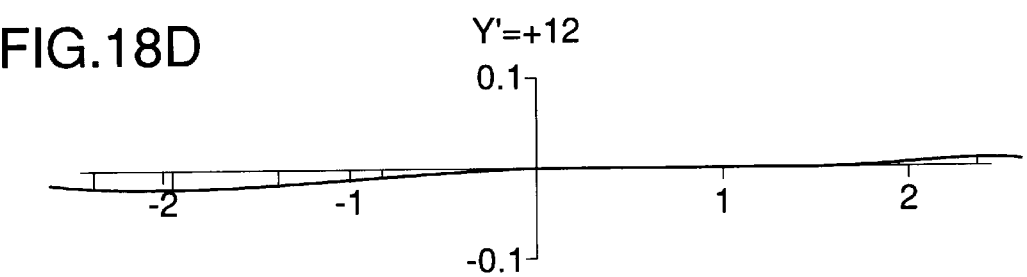
Figure 18E:
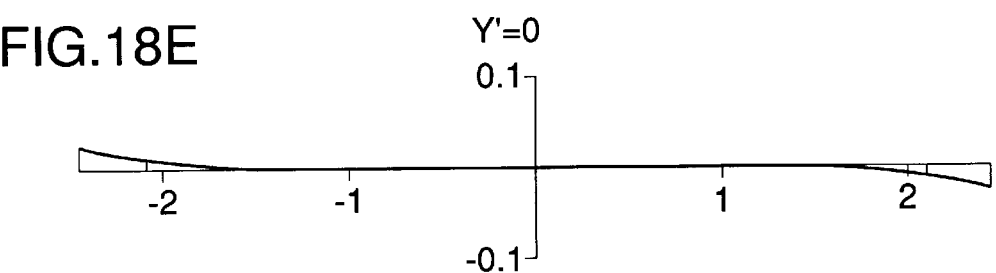
Figure 19A:
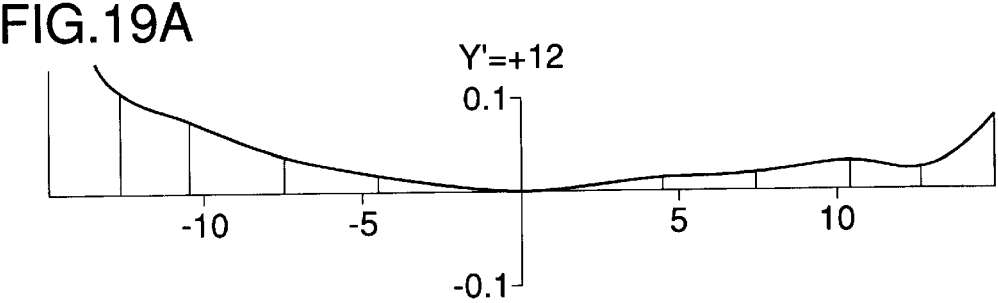
FIGS. 19A to 19E are graphic representations of the meridional lateral aberrations observed before and after decentering at the telephoto end in an infinite-distance shooting condition in the third embodiment.
Figure 19B:
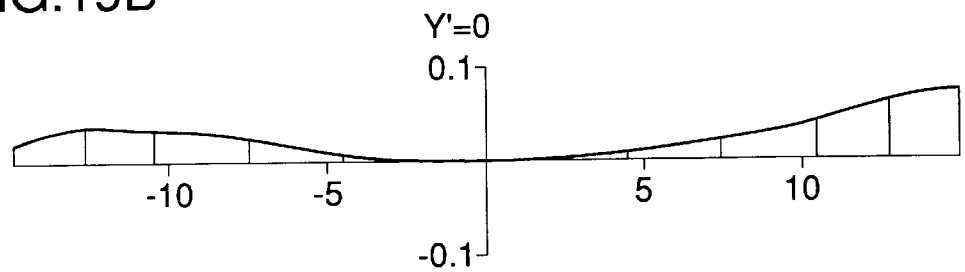
Figure 19C:
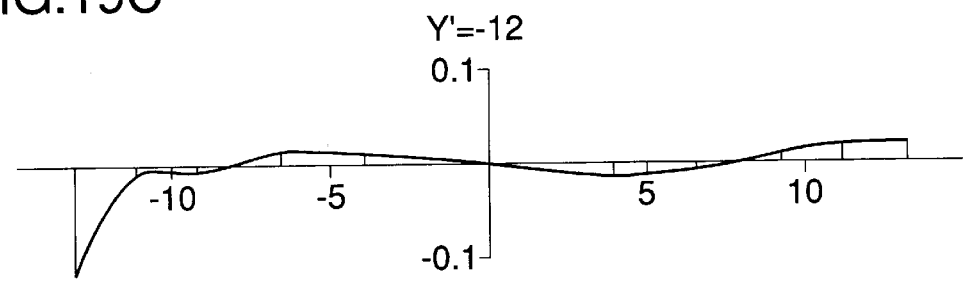
Figure 19D:
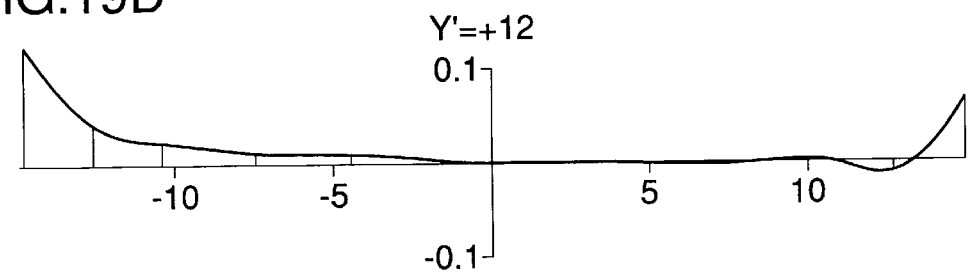
Figure 19E:
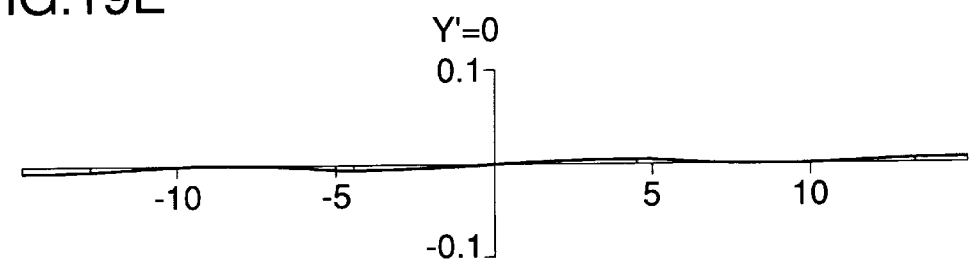
Figure 20A:
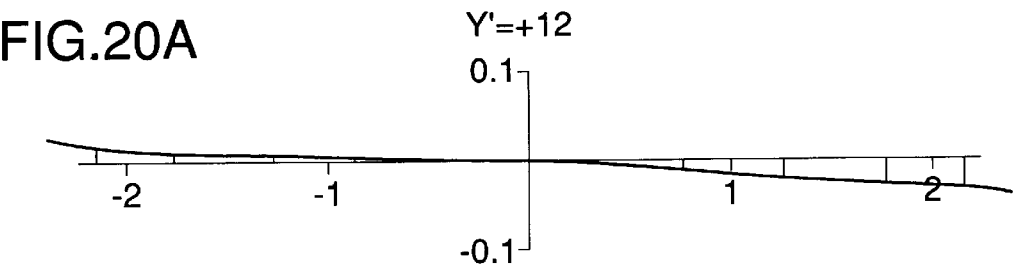
FIGS. 20A to 20E are graphic representations of the meridional lateral aberrations observed before and after decentering at the wide-angle end in a closest-distance shooting condition in the third embodiment.
Figure 20B:
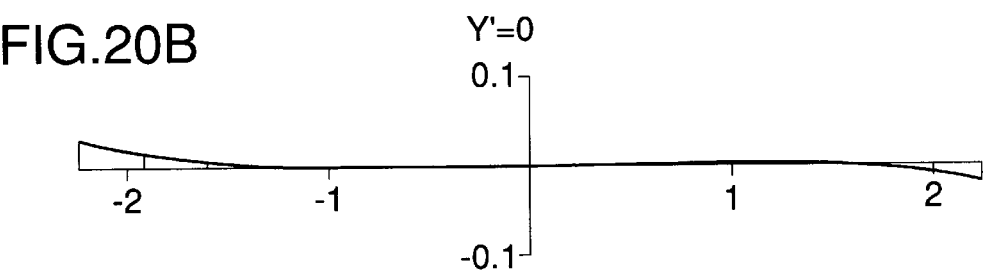
Figure 20C:
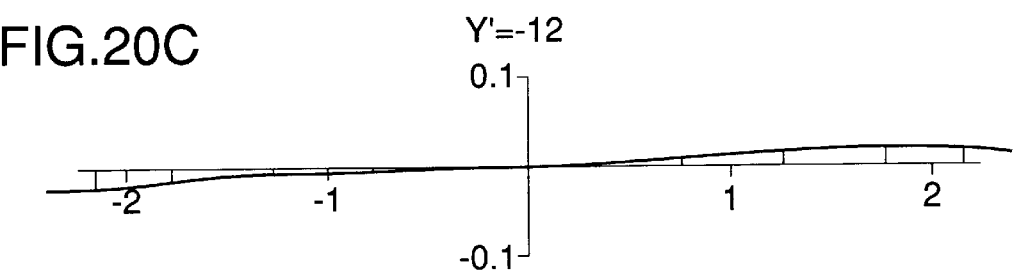
Figure 20D:
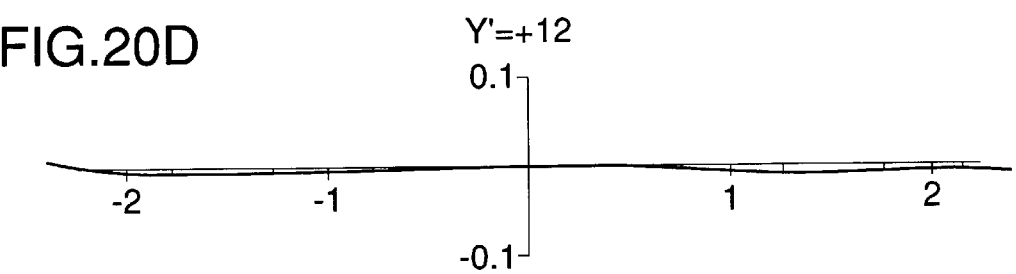
Figure 20E:
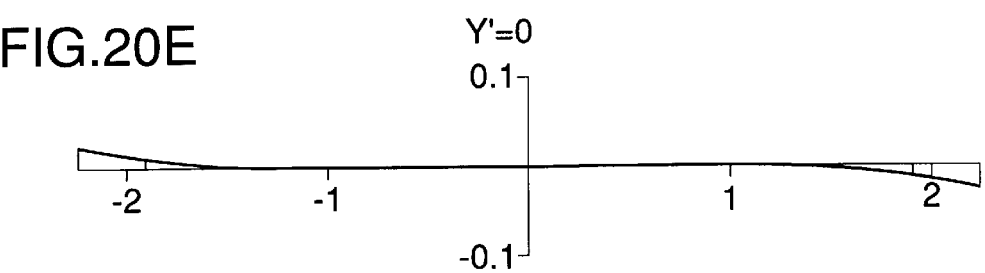
Figure 21A:
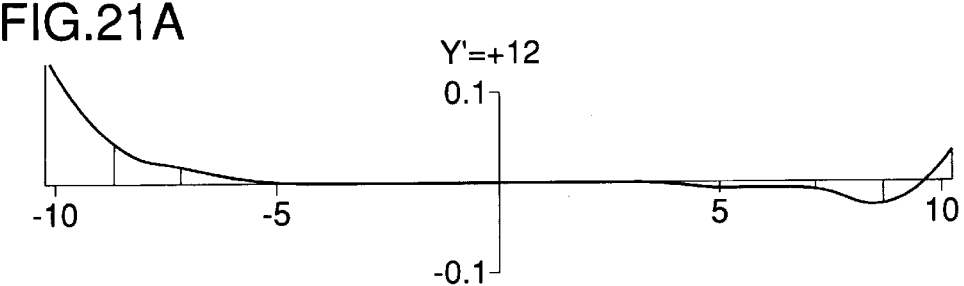
FIGS. 21A to 21E are graphic representations of the meridional lateral aberrations observed before and after decentering at the telephoto end in a closest-distance shooting condition in the third embodiment.
Figure 21B:
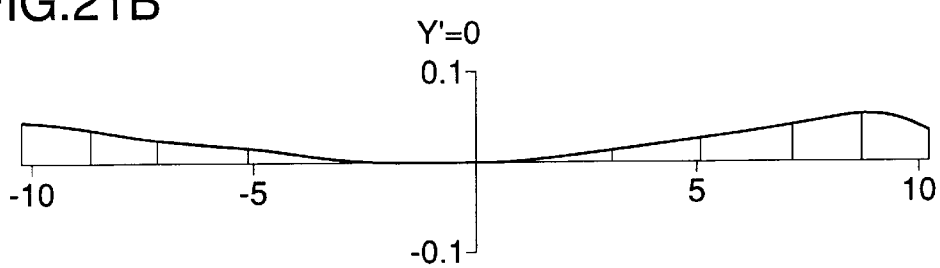
Figure 21C:
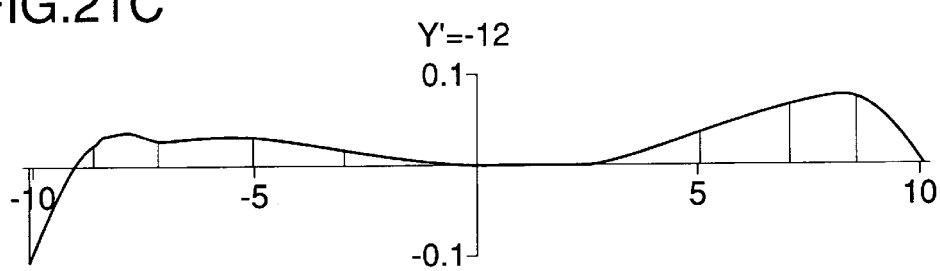
Figure 21D:
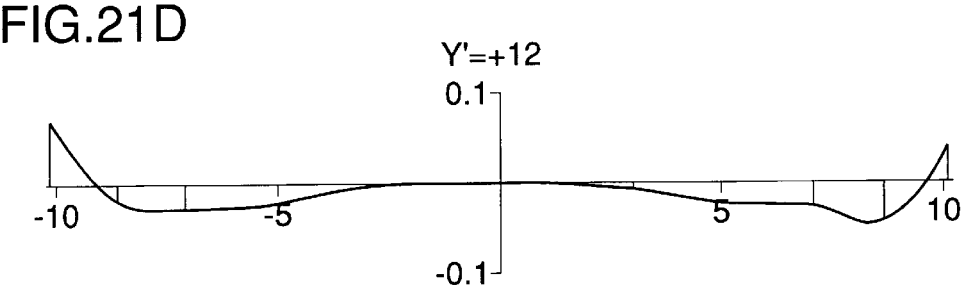
Figure 21E:
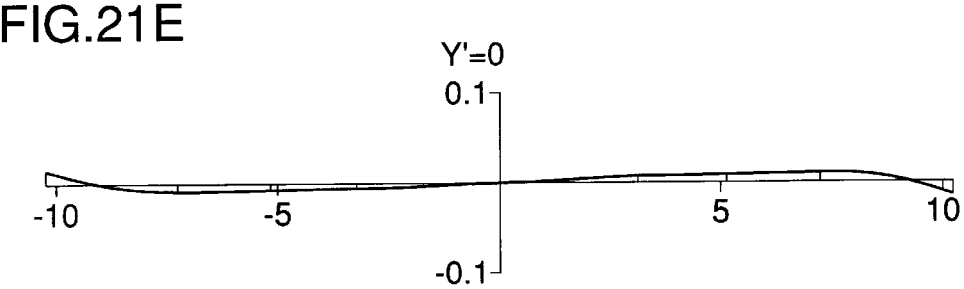

FIGS. 2A, 2D, 2G; FIGS. 3A, 3D, 3G; FIGS. 9A, 9D, 9G; FIGS. 10A, 10D, 10G; FIGS. 16A, 16D, 16G; and FIGS. 17A, 17D, 17G show spherical aberration and sine condition. In these diagrams, the solid line (d) represents the spherical aberration for d-line and the broken line (SC) represents the sine condition. FIGS. 2B, 2E, 2H; FIGS. 3B, 3E, 3H; FIGS. 9B, 9E, 9H; FIGS. 10B, 10E, 10H; FIGS. 16B, 16E, 16H; and FIGS. 17B, 17E, 17H show astigmatism (Y' represents the image height). In these diagrams, the broken line (DM) and the solid line (DS) represent the astigmatism for d-line on the meridional plane and on the sagittal plane, respectively. FIGS. 2C, 2F, 2I; FIGS. 3C, 3F, 3I; FIGS. 9C, 9F, 9I; FIGS. 10C, 10F, 10I; FIGS. 16C, 16F, 16I; and FIGS. 17C, 17F, 17I show distortion (Y' represents the image height).

FIGS. 4A to 4E, 5A to 5E, 6A to 6E, 7A to 7E, 11A to 11E, 12A to 12E, 13A to 13E, 14A to 14E, 18A to 18E, 19A to 19E, 20A to 20E, and 21A to 21E show the aberrations observed before and after decentering (in the normal state or during image blur compensation) in the embodiments. Of these, FIGS. 4A to 4E, 5A to 5E, 11A to 11E, 12A to 12E, 18A to 18E, and 19A to 19E show the lateral aberrations observed on the meridional plane before and after decentering in the infinite-distance shooting condition in the embodiments. FIGS. 6A to 6E, 7A to 7E, 13A to 13E, 14A to 14E, 20A to 20E, and 21A to 21E show the lateral aberrations observed on the meridional plane before and after decentering in the closest-distance shooting condition in the embodiments. FIGS. 4A to 4E, 5A to 5E, 6A to 6E, and 7A to 7E show the aberrations observed in the first embodiment, FIGS. 11A to 11E, 12A to 12E, 13A to 13E, and 14A to 14E show the aberrations observed in the second embodiment, and FIGS. 18A to 18E, 19A to 19E, 20A to 20E, and 21A to 21E show the aberrations observed in the third embodiment.

FIGS. 4A to 4E, 6A to 6E, 11A to 11E, 13A to 13E, 18A to 18E, and 20A to 20E show the aberrations observed at the wide-angle end [W], and FIGS. 5A to 5E, 7A to 7E, 12A to 12E, 14A to 14E, 19A to 19E, and 21A to 21E show the aberrations observed at the telephoto end [T]. FIGS. 4A to 4C, 5A to 5C, 6A to 6C, 7A to 7C, 11A to 11C, 12A to 12C, 13A to 13C, 14A to 14C, 18A to 18C, 19A to 19C, 20A to 20C, and 21A to 21C show the lateral aberrations observed at image heights Y'=+12, 0, -12 during image blur compensation where an image blur of 0.7° is being compensated {i.e. during image blur compensation where the image blur compensating lens unit is in a state for compensating an image blur of 0.7° (=0.0122173 rad)}; and FIGS. 4D and 4E, 5D and 5E, 6D and 6E, 7D and 7E, 11D and 11E, 12D and 12E, 13D and 13E, 14D and 14E, 18D and 18E, 19D and 19E, 20D and 20E, and 21D and 21E show the lateral aberrations observed at image heights Y'=+12, 0 in the normal state.

Table 5 lists the off-axial image-point movement errors and axial lateral chromatic aberrations observed during image blur compensation where an image blur of 0.7° is being compensated in the embodiments. In Table 5, the values grouped under [W], [M], and [T] represent the off-axial image-point movement errors (mm) and axial lateral chromatic aberrations (mm) observed at the wide-angle end, at the middle focal length, and at the telephoto end, respectively. Moreover, in Table 5, for each of the three focal length conditions mentioned above, three values are given that are, from above, the value at an image height Y'=12 mm (+12, 0) on the meridional plane, the value at an image height Y'=-12 mm (-12, 0) on the meridional plane, and the value at an image height Y'=12 mm (0, +12) {note that negative and positive errors or aberrations appear symmetrically} on the sagittal plane. In addition, axial lateral chromatic aberrations are calculated as differences between aberrations for the d- and g-lines.

Figure 22:
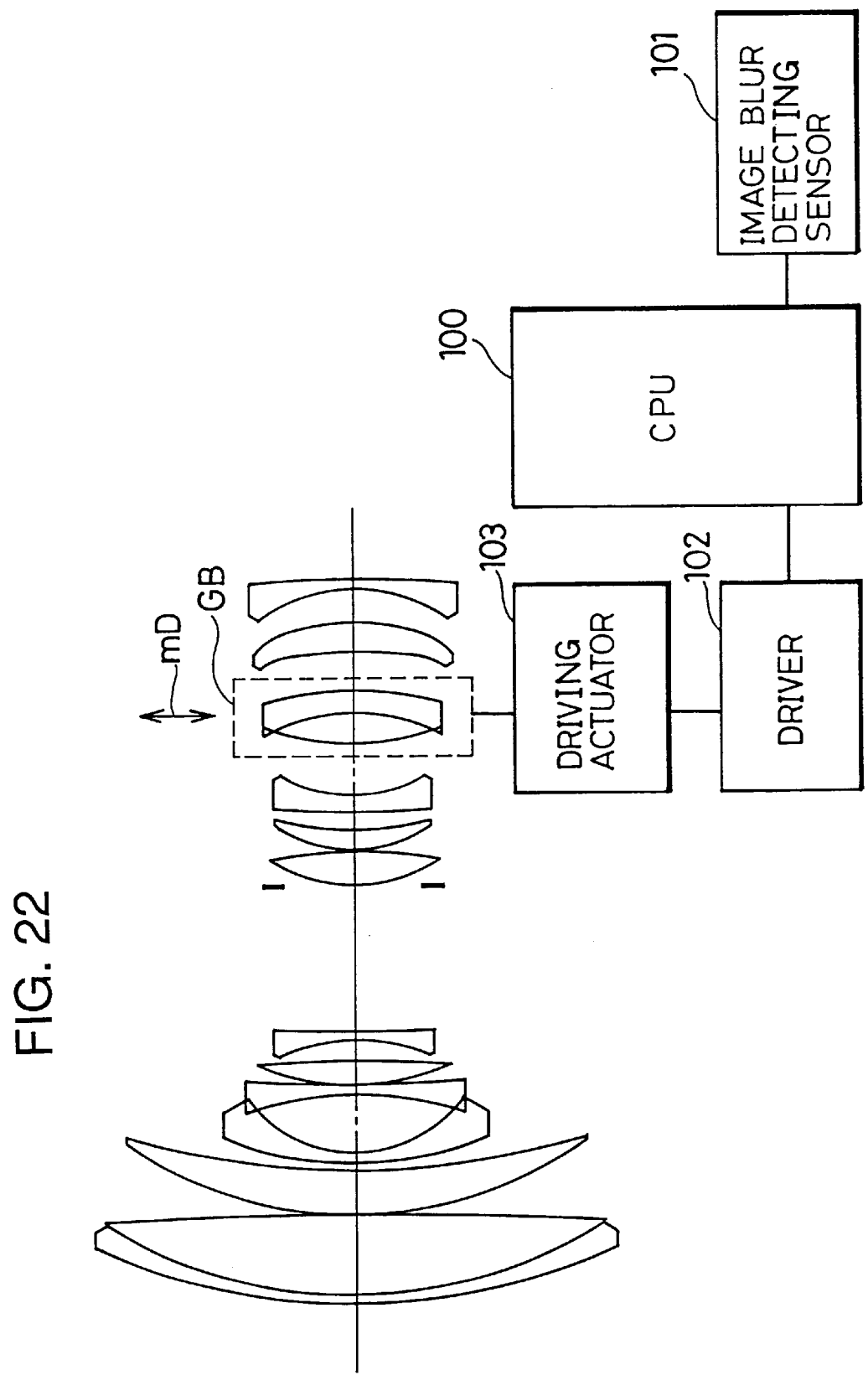
FIG. 22 is a block diagram showing the control system for moving the image blur compensating lens unit of the first embodiment.

FIG. 22 is a block diagram showing the control structure for moving the image blur compensating lens unit in the zoom lens system of the first embodiment. An image blur detecting sensor 101 is either incorporated in the lens unit or provided separately therefrom so as to detect the magnitude and direction of an image blur. The detection results are fed to a CPU 100, which in response outputs to a driver 102 a control signal indicating the distance and direction through and in which a driving actuator 103 is to be driven. The driver 102, in accordance with the control signal fed from the CPU 100, generates driving pulses for driving the driving actuator 103. The driving actuator 103, in accordance with the driving pulses, moves the image blur compensating lens unit through the specified distance in the specified direction that is perpendicular to the optical axis so as to achieve image blur compensation.

Note that a common stepping motor or a piezoelectric actuator using a PZT (lead titanate zirconate) device may be used as the driving actuator 103. Furthermore, when the zoom lens system of the first embodiment is applied, for example, to an interchangeable lens for a single-lens reflex camera, the CPU 100 and the image blur detecting sensor 101 may be provided either in the lens or in the camera body.

TABLE 1

Construction Data of Embodiment 1
(positive-negative-positive-positive-negative)
f = 22.50 ~ 69.99 ~ 214.92
FNO = 4.60 ~ 6.20 ~ 7.69

| Radius of Curvature | Axial Distance | Refractive Index | Abbe Number |
|---|---|---|---|
| r1 = 60.911 | | | |
| | d1 = 0.960 | N1 = 1.83350 | v1 = 21.00 |
| r2 = 46.992 | | | |
| | d2 = 7.455 | N2 = 1.49310 | v2 = 83.58 |
| r3 = −1095.638 | | | |
| | d3 = 0.100 | | |
| r4 = 37.500 | | | |
| | d4 = 4.594 | N3 = 1.49310 | v3 = 83.58 |
| r5 = 74.197 | | | |
| | d5 = 0.685 ~ 20.425 ~ 34.113 | | |
| r6* = 37.598 | | | |
| | d6 = 0.960 | N4 = 1.77250 | v4 = 49.77 |
| r7 = 12.530 | | | |
| | d7 = 5.895 | | |
| r8 = −31.071 | | | |
| | d8 = 0.960 | N5 = 1.77250 | v5 = 49.77 |
| r9 = 123.107 | | | |
| | d9 = 0.100 | | |
| r10 = 24.579 | | | |
| | d10 = 2.304 | N6 = 1.83350 | v6 = 21.00 |
| r11 = −116.103 | | | |
| | d11 = 2.030 | | |
| r12 = −18.519 | | | |
| | d12 = 0.960 | N7 = 1.75450 | v7 = 51.57 |
| r13 = 219.304 | | | |
| | d13 = 14.541 ~ 6.992 ~ 0.640 | | |
| r14 = ∞(Aperture Stop S) | | | |
| | d14 = 0.100 | | |
| r15 = 14.486 | | | |
| | d15 = 3.420 | N8 = 1.49310 | v8 = 83.58 |
| r16 = −52.186 | | | |
| | d16 = 0.100 | | |
| r17 = 11.999 | | | |
| | d17 = 2.255 | N9 = 1.49310 | v9 = 83.58 |
| r18 = 29.718 | | | |
| | d18 = 1.636 | | |
| r19* = 66.111 | | | |
| | d19 = 1.912 | N10 = 1.83400 | v10 = 37.05 |
| r20* = 16.132 | | | |
| | d20 = 5.200 ~ 2.775 ~ 2.300 | | |
| r21 = 25.231 | | | |
| | d21 = 2.955 | N11 = 1.48749 | v11 = 70.44 |
| r22 = −18.088 | | | |
| | d22 = 2.000 | N12 = 1.83350 | v12 = 21.00 |
| r23 = −32.687 | | | |

TABLE 1-continued

Construction Data of Embodiment 1
(positive-negative-positive-positive-negative)
f = 22.50 ~ 69.99 ~ 214.92
FNO = 4.60 ~ 6.20 ~ 7.69

| | | | |
|---|---|---|---|
| | d23 = 3.678 ~ 2.065 ~ 1.000 | | |
| r24* = −64.281 | | | |
| | d24 = 2.804 | N13 = 1.84666 | v13 = 23.82 |
| r25* = −23.387 | | | |
| | d25 = 3.437 | | |
| r26 = −15.978 | | | |
| | d26 = 0.960 | N14 = 1.75450 | v14 = 51.57 |
| r27 = −124.076 | | | |

[Aspherical Coefficient of Surface r6]

$\epsilon$ = 1.0000
A4 = 0.83645300 × 10$^{-5}$
A6 = 0.67353100 × 10$^{-7}$
A8 = −0.10566100 × 10$^{-8}$
A10 = 0.51276200 × 10$^{-11}$
A12 = 0.88135000 × 10$^{-15}$

[Aspherical Coefficient of Surface r19]

$\epsilon$ = 1.0000
A4 = −0.39985900 × 10$^{-4}$
A6 = 0.21782000 × 10$^{-6}$
A8 = 0.95114000 × 10$^{-9}$
A10 = −0.20385600 × 10$^{-10}$
A12 = −0.29974600 × 10$^{-12}$

[Aspherical Coefficient of Surface r20]

$\epsilon$ = 1.0000
A4 = 0.77224600 × 10$^{-4}$
A6 = 0.72183200 × 10$^{-6}$
A8 = 0.51068600 × 10$^{-8}$
A10 = 0.42389400 × 10$^{-10}$
A12 = −0.73088800 × 10$^{-12}$

[Aspherical Coefficient of Surface r24]

$\epsilon$ = 1.0000
A4 = −0.45652900 × 10$^{-4}$
A6 = −0.51530100 × 10$^{-6}$
A8 = −0.52845600 × 10$^{-8}$
A10 = 0.41459300 × 10$^{-10}$
A12 = −0.71354200 × 10$^{-12}$

[Aspherical Coefficient of Surface r25]

$\epsilon$ = 1.0000
A4 = −0.34438900 × 10$^{-4}$
A6 = −0.52934900 × 10$^{-6}$
A8 = 0.50113400 × 10$^{-9}$
A10 = −0.43265700 × 10$^{-10}$
A12 = −0.20027900 × 10$^{-14}$

TABLE 2

Construction Data of Embodiment 2 (positive-negative-positive-negative)
f = 22.51 ~ 70.01 ~ 215.46
FNO = 4.60 ~ 6.20 ~ 7.20

| Radius of Curvature | Axial Distance | Refractive Index | Abbe Number |
|---|---|---|---|
| r1 = 88.793 | | | |
| | d1 = 2.611 | N1 = 1.83350 | v1 = 21.00 |
| r2 = 69.117 | | | |
| | d2 = 7.307 | N2 = 1.49310 | v2 = 83.58 |
| r3 = 2587.322 | | | |
| | d3 = 0.100 | | |
| r4 = 57.723 | | | |
| | d4 = 4.935 | N3 = 1.49310 | v3 = 83.58 |
| r5 = 127.503 | | | |
| | d5 = 0.836 ~ | | |

TABLE 2-continued

Construction Data of Embodiment 2 (positive-negative-positive-negative)
f = 22.51 ~ 70.01 ~ 215.46
FNO = 4.60 ~ 6.20 ~ 7.20

|  | Radius of Curvature |  | Axial Distance | Refractive Index | Abbe Number |
|---|---|---|---|---|---|
|  |  |  | 34.003 ~ 58.967 |  |  |
| r6* = | 44.870 |  |  |  |  |
|  |  | d6 = | 0.850 | N4 = 1.77250 | ν4 = 49.77 |
| r7 = | 13.694 |  |  |  |  |
|  |  | d7 = | 6.909 |  |  |
| r8 = | −34.456 |  |  |  |  |
|  |  | d8 = | 0.850 | N5 = 1.77250 | ν5 = 49.77 |
| r9 = | 423.481 |  |  |  |  |
|  |  | d9 = | 0.100 |  |  |
| r10 = | 28.647 |  |  |  |  |
|  |  | d10 = | 2.822 | N6 = 1.83350 | ν6 = 21.00 |
| r11 = | −177.318 |  |  |  |  |
|  |  | d11 = | 1.954 |  |  |
| r12 = | −22.331 |  |  |  |  |
|  |  | d12 = | 0.850 | N7 = 1.75450 | ν7 = 51.57 |
| r13 = | 370.501 |  |  |  |  |
|  |  | d13 = | 14.970 ~ 6.662 ~ 0.612 |  |  |
| r14 = | ∞(Aperture Stop S) |  |  |  |  |
|  |  | d14 = | 0.100 |  |  |
| r15 = | 14.072 |  |  |  |  |
|  |  | d15 = | 3.047 | N8 = 1.49310 | ν8 = 83.58 |
| r16 = | −82.820 |  |  |  |  |
|  |  | d16 = | 0.617 |  |  |
| r17 = | 12.765 |  |  |  |  |
|  |  | d17 = | 3.750 | N9 = 1.49310 | ν9 = 83.58 |
| r18 = | 41.408 |  |  |  |  |
|  |  | d18 = | 1.122 |  |  |
| r19* = | 127.264 |  |  |  |  |
|  |  | d19 = | 1.319 | N10 = 1.83400 | ν10 = 37.05 |
| r20* = | 18.577 |  |  |  |  |
|  |  | d20 = | 7.896 ~ 3.230 ~ 2.219 |  |  |
| r21 = | 24.782 |  |  |  |  |
|  |  | d21 = | 3.196 | N11 = 1.48749 | ν11 = 70.44 |
| r22 = | −20.010 |  |  |  |  |
|  |  | d22 = | 1.500 | N12 = 1.83350 | ν12 = 21.00 |
| r23 = | −35.612 |  |  |  |  |
|  |  | d23 = | 4.022 |  |  |
| r24* = | −52.169 |  |  |  |  |
|  |  | d24 = | 3.637 | N13 = 1.84666 | ν13 = 23.82 |
| r25* = | −20.109 |  |  |  |  |
|  |  | d25 = | 1.277 |  |  |
| r26 = | −15.605 |  |  |  |  |
|  |  | d26 = | 0.850 | N14 = 1.75450 | ν14 = 51.57 |
| r27 = | −183.819 |  |  |  |  |

[Aspherical Coefficient of Surface r6]

ε = 1.0000
A4 = 0.84449900 × 10$^{-5}$
A6 = 0.63551500 × 10$^{-8}$
A8 = 0.20154300 × 10$^{-11}$
A10 = −0.14396400 × 10$^{-12}$
A12 = 0.17773000 × 10$^{-14}$

[Aspherical Coefficient of Surface r19]

ε = 1.0000
A4 = −0.40326000 × 10$^{-4}$
A6 = 0.26710500 × 10$^{-6}$
A8 = 0.12593500 × 10$^{-8}$
A10 = −0.19817800 × 10$^{-10}$
A12 = −0.47458300 × 10$^{-12}$

[Aspherical Coefficient of Surface r20]

ε = 1.0000
A4 = 0.82195200 × 10$^{-4}$
A6 = 0.74794100 × 10$^{-6}$
A8 = 0.70469000 × 10$^{-8}$
A10 = 0.24450700 × 10$^{-10}$
A12 = −0.47794400 × 10$^{-12}$

TABLE 2-continued

Construction Data of Embodiment 2 (positive-negative-positive-negative)
f = 22.51 ~ 70.01 ~ 215.46
FNO = 4.60 ~ 6.20 ~ 7.20

[Aspherical Coefficient of Surface r24]

ε = 1.0000
A4 = −0.51552400 × 10$^{-4}$
A6 = −0.42163600 × 10$^{-6}$
A8 = −0.18955400 × 10$^{-8}$
A10 = 0.71695600 × 10$^{-10}$
A12 = −0.17765700 × 10$^{-11}$

[Aspherical Coefficient of Surface r25]

ε = 1.0000
A4 = −0.32518400 × 10$^{-4}$
A6 = −0.37081400 × 10$^{-6}$
A8 = 0.25625300 × 10$^{-8}$
A10 = −0.42716300 × 10$^{-10}$
A12 = −0.31376100 × 10$^{-12}$

TABLE 3

Construction Data of Embodiment 3
(positive-negative-positive-positive-negative)
f = 22.50 ~ 70.07 ~ 214.94
FNO = 4.60 ~ 6.20 ~ 7.20

|  | Radius of Curvature |  | Axial Distance | Refractive Index | Abbe Number |
|---|---|---|---|---|---|
| r1 = | 62.115 |  |  |  |  |
|  |  | d1 = | 0.850 | N1 = 1.83350 | ν1 = 21.00 |
| r2 = | 49.652 |  |  |  |  |
|  |  | d2 = | 6.692 | N2 = 1.49310 | ν2 = 83.58 |
| r3 = | 1351.225 |  |  |  |  |
|  |  | d3 = | 0.100 |  |  |
| r4 = | 44.800 |  |  |  |  |
|  |  | d4 = | 4.254 | N3 = 1.49310 | ν3 = 83.58 |
| r5 = | 96.785 |  |  |  |  |
|  |  | d5 = | 0.858 ~ 22.154 ~ 40.664 |  |  |
| r6* = | 35.557 |  |  |  |  |
|  |  | d6 = | 0.850 | N4 = 1.77250 | ν4 = 49.77 |
| r7 = | 12.555 |  |  |  |  |
|  |  | d7 = | 5.826 |  |  |
| r8 = | −38.037 |  |  |  |  |
|  |  | d8 = | 0.850 | N5 = 1.77250 | ν5 = 49.77 |
| r9 = | 53.529 |  |  |  |  |
|  |  | d9 = | 0.100 |  |  |
| r10 = | 24.577 |  |  |  |  |
|  |  | d10 = | 2.601 | N6 = 1.83350 | ν6 = 21.00 |
| r11 = | −208.564 |  |  |  |  |
|  |  | d11 = | 2.468 |  |  |
| r12 = | −18.453 |  |  |  |  |
|  |  | d12 = | 0.850 | N7 = 1.75450 | ν7 = 51.57 |
| r13 = | −1321.161 |  |  |  |  |
|  |  | d13 = | 0.100 ~ 0.100 ~ 0.100 |  |  |
| r14 = | 39.994 |  |  |  |  |
|  |  | d14 = | 1.004 | N8 = 1.77250 | ν8 = 49.77 |
| r15 = | 51.421 |  |  |  |  |
|  |  | d15 = | 14.126 ~ 6.354 ~ 0.631 |  |  |
| r16 = | ∞(Aperture Stop S) |  |  |  |  |
|  |  | d16 = | 0.100 |  |  |
| r17 = | 14.027 |  |  |  |  |
|  |  | d17 = | 3.681 | N9 = 1.49310 | ν9 = 83.58 |
| r18 = | −550.070 |  |  |  |  |
|  |  | d18 = | 0.100 |  |  |
| r19 = | 12.779 |  |  |  |  |
|  |  | d19 = | 4.500 | N10 = 1.49310 | ν10 = 83.58 |

TABLE 3-continued

Construction Data of Embodiment 3
(positive-negative-positive-positive-negative)
$f = 22.50 \sim 70.07 \sim 214.94$
$FNO = 4.60 \sim 6.20 \sim 7.20$

| | | | | | |
|---|---|---|---|---|---|
| r20 = | −56.499 | | | | |
| | | d20 = | 0.867 | | |
| r21* = | −32.009 | | | | |
| | | d21 = | 2.058 | N11 = 1.83400 | ν11 = 37.05 |
| r22* = | 49.010 | | | | |
| | | d22 = | 4.775 ~ 0.100 ~ 0.580 | | |
| r23 = | 27.407 | | | | |
| | | d23 = | 2.594 | N12 = 1.48749 | ν12 = 70.44 |
| r24 = | −43.211 | | | | |
| | | d24 = | 2.579 | N13 = 1.83350 | ν13 = 21.00 |
| r25 = | −89.260 | | | | |
| | | d25 = | 4.047 ~ 4.835 ~ 3.318 | | |
| r26* = | −27.032 | | | | |
| | | d26 = | 2.611 | N14 = 1.84666 | ν14 = 23.82 |
| r27* = | −16.154 | | | | |
| | | d27 = | 1.161 | | |
| r28 = | −11.853 | | | | |
| | | d28 = | 0.850 | N15 = 1.75450 | ν15 = 51.57 |
| r29 = | −38.069 | | | | |

[Aspherical Coefficient of Surface r6]

$\epsilon = 1.0000$
$A4 = 0.66392800 \times 10^{-5}$
$A6 = -0.35561500 \times 10^{-7}$
$A8 = 0.28951400 \times 10^{-9}$
$A10 = -0.11033500 \times 10^{-11}$
$A12 = 0.54879700 \times 10^{-14}$

[Aspherical Coefficient of Surface r21]

$\epsilon = 1.0000$
$A4 = 0.59076200 \times 10^{-4}$
$A6 = 0.82572900 \times 10^{-6}$
$A8 = -0.12752000 \times 10^{-7}$
$A10 = -0.87916000 \times 10^{-10}$
$A12 = 0.15020400 \times 10^{-11}$

[Aspherical Coefficient of Surface r22]

$\epsilon = 1.0000$
$A4 = 0.19223400 \times 10^{-3}$
$A6 = 0.43866100 \times 10^{-6}$
$A8 = 0.59818500 \times 10^{-7}$
$A10 = -0.16565500 \times 10^{-8}$
$A12 = 0.15712800 \times 10^{-10}$

[Aspherical Coefficient of Surface r26]

$\epsilon = 1.0000$
$A4 = -0.10553800 \times 10^{-3}$
$A6 = -0.10910900 \times 10^{-5}$
$A8 = 0.43503400 \times 10^{-7}$
$A10 = -0.82295000 \times 10^{-9}$
$A12 = 0.40413400 \times 10^{-11}$

[Aspherical Coefficient of Surface r27]

$\epsilon = 1.0000$
$A4 = -0.69947800 \times 10^{-4}$
$A6 = -0.87885400 \times 10^{-6}$
$A8 = 0.29904700 \times 10^{-7}$
$A10 = -0.50361200 \times 10^{-9}$
$A12 = 0.20882900 \times 10^{-11}$

TABLE 4

<<Values Corresponding to Conditions (1) to (5')>>

| Cond. | | Emb. 1 | Emb. 2 | Emb. 3 |
|---|---|---|---|---|
| (1) | f1/fW | 73.72/22.50 = 3.28 | 110.96/22.5 = 4.93 | 82.00/22.5 = 3.64 |
| (2) | f2/fW | −11.50/22.50 = −0.51 | −13.28/22.5 = −0.59 | −11.86/22.5 = −0.53 |
| (3) | LBW/Y | 18.00/17.25 = 1.04 | 18.29/17.25 = 1.06 | 18.00/17.25 = 1.04 |
| (3') | max | | | |
| (4) | fB/fR | 39.34/−67.67 = −0.58 | 39.26/−59.32 = −0.66 | 52.79/−48.13 = −1.09 |
| (5) | fB/fW | 39.34/22.5 = 2.33 | 39.26/22.5 = 1.74 | 52.79/22.5 = 2.35 |
| (5') | | | | |

TABLE 5

Off-axial Image-point Movement Error and
Axial Lateral Chromatic Aberration ($\theta = 0.7°$)

| | | | Off-axial Image-point Movement Error (mm) | Axial Lateral Chromatic Aberration (mm) |
|---|---|---|---|---|
| Emb.1 | [W] | (+12, 0) | 0.0118 | 0.013 |
| | | (−12, 0) | 0.0146 | |
| | | ( 0,+2) | 0.0335 | |
| | [M] | (+12, 0) | 0.0101 | 0.015 |
| | | (−12, 0) | 0.0207 | |
| | | ( 0,+2) | 0.0226 | |
| | [T] | (+12, 0) | 0.0007 | 0.023 |
| | | (−12, 0) | 0.0449 | |
| | | ( 0,+2) | 0.0218 | |
| Emb.2 | [W] | (+12, 0) | 0.0041 | −0.003 |
| | | (−12, 0) | −0.0014 | |
| | | ( 0,+2) | 0.0303 | |
| | [M] | (+12, 0 | 0.0030 | 0.008 |
| | | (−12, 0) | 0.0135 | |
| | | ( 0,+2) | 0.0200 | |
| | [T] | (+12, 0) | −0.0072 | 0.022 |
| | | (−12, 0) | 0.0505 | |
| | | ( 0,+2) | 0.0221 | |
| Emb.3 | [W] | (+12, 0) | 0.0020 | 0.003 |
| | | (−12, 0) | 0.0041 | |
| | | ( 0,+2) | 0.308 | |
| | [M] | (+12, 0) | 0.0060 | 0.007 |
| | | (−12, 0) | 0.0246 | |
| | | ( 0,+2) | 0.0231 | |
| | [T] | (+12, 0) | −0.0137 | 0.015 |
| | | (−12, 0) | 0.0444 | |
| | | ( 0,+2) | 0.0182 | |

What is claimed is:

1. A zoom lens system comprising, in order from an object side of said zoom lens system:
   a first lens unit movable along an optical axis during a focusing operation;
   a second lens unit including an aperture stop; and
   a third lens unit including, at least in part, an image blur compensating lens unit, said image blur compensating lens unit being adapted to compensate for an image blur caused by vibration of the zoom lens system,
   wherein distances between said first, second, and third lens units are variable so as to change a focal length of the entire zoom lens system.

2. A zoom lens system in accordance with claim 1, wherein said second lens unit is provided on an image side of said first lens unit with a first variable air gap in between.

3. A zoom lens system in accordance with claim 1, wherein said second lens unit is provided on an object side of said third lens unit with a second variable air gap in between.

4. A zoom lens system in accordance with claim 1,
wherein at least a part of said third lens unit moves in a direction perpendicular to an optical axis of the zoom lens system.

5. A zoom lens system in accordance with claim 1,
wherein said image blur compensating lens unit consists of a single lens element.

6. A zoom lens system in accordance with claim 1,
wherein said image blur compensating lens unit consists of a doublet lens element formed by cementing two lens elements together.

7. A zoom lens system comprising, in order from an object side of said zoom lens system:
a first lens unit;
a second lens unit including an aperture stop; and
a third lens unit including, at least in part, an image blur compensating lens unit, said image blur compensating lens unit, having a single lens element, is adapted to compensate for an image blur caused by vibration of the zoom lens system,
wherein distances between said first, second, and third lens units are variable so as to change a focal length of the entire zoom lens system.

8. A zoom lens system in accordance with claim 7,
wherein said second lens unit is provided on an image side of said first lens unit with a first variable air gap in between.

9. A zoom lens system in accordance with claim 7,
wherein said second lens unit is provided on an object side of said third lens unit with a second variable air gap in between.

10. A zoom lens system in accordance with claim 7,
wherein at least a part of said third lens unit moves in a direction perpendicular to an optical axis of the zoom lens system.

11. A zoom lens system comprising, in order from an object side of said zoom lens system:
a first lens unit having a positive optical power;
a second lens unit having a negative optical power;
a third lens unit having a positive optical power, said third lens unit being adapted for decentering so as to compensate for image blur caused by vibration of the zoom lens system; and
a fourth lens unit having a negative optical power, said fourth lens unit being provided at an image-side end of the zoom lens system,
wherein tho following conditions are fulfilled:

$$1.5<f1/fW<6.0$$
$$-1.0<f2/fW<-0.20$$
$$-1.5<fB/fR<-0.3$$
$$0.8<fB/fW<4.0$$

where
f1 represents a focal length of the first lens unit,
f2 represents a focal length of the second lens unit,
fW represents a focal length of the entire zoom lens system in a shortest focal length condition,
fB represents a focal length of the third lens unit, and
fR represents a focal length of the fourth lens unit.

12. A zoom lens system in accordance with claim 11,
wherein said third lens unit consists of a doublet lens element formed by cementing two lens elements together.

13. A zoom lens system in accordance with claim 11,
wherein said second lens unit is movable along an optical axis during a focusing operation.

14. A zoom lens system in accordance with claim 13,
wherein for a focusing operation from an infinite object distance to a closest object distance, said second lens unit is adapted to move along said optical axis toward said object side.

15. A zoom lens system in accordance with claim 11,
wherein an aperture stop is provided in one of said first, second, and fourth lens units.

16. A zoom lens system having a plurality of lenses, said plurality of lenses including, in order from an object side of said zoom lens system:
a first lens unit movable along an optical axis during a focusing operation;
a second lens unit including an aperture stop; and
a third lens unit including, at least in part, an image blur compensating lens unit, said image blur compensating lens unit being adapted to compensate for an image blur caused by vibration of the zoom lens system by decentering along a direction perpendicular to said optical axis,
wherein distances between said first, second, and third lens units are variable so as to change a focal length of the entire zoom lens system.

17. A zoom lens system comprising, in order from an object side of said zoom lens system:
an object side lens unit having a positive optical power and located at the object side of said zoom lens system;
a focusing lens unit having a negative optical power and located at an image side of said object side lens unit, said focusing lens unit being movable toward the object side of said zoom lens system during a focusing operation;
a first succeeding lens unit including an aperture stop; and
a second succeeding lens unit including, at least in part, an image blur compensating lens unit, said image blur compensating lens unit being adapted to compensate for an image blur caused by vibration of said zoom lens system,
wherein distances between said object side, focusing, first succeeding and second succeeding lens units are variable so as to change a focal length of the entire zoom lens system.

18. A zoom lens system in accordance with claim 17,
wherein said first succeeding lens unit has a positive optical power.

19. A zoom lens system in accordance with claim 17,
wherein said second succeeding lens unit has a positive optical power.

20. A zoom lens system in accordance with claim 17,
wherein at least a part of said second succeeding lens unit moves in a direction perpendicular to an optical axis of the zoom lens system.

21. A zoom lens system in accordance with claim 17,
wherein said image blur compensating lens unit consists of a single lens element.

22. A zoom lens system in accordance with claim 17,
wherein said image blur compensating lens unit consists of a doublet lens element formed by cementing two lens elements together.

* * * * *

UNITED STATES PATENT AND TRADEMARK OFFICE
CERTIFICATE OF CORRECTION

PATENT NO : U.S. Patent No. 6,010,537
DATED : January 4, 2000
INVENTOR(S): Kenji KONNO et al.

It is certified that error appears in the above-identified patent and that said Letters Patent is hereby corrected as shown below:

On the title Page [75], Inventors: after "Kenji Konno," delete "Daito" and insert --Sakai-Shi--.

On the title Page [75], Inventors: after "Hideki Nagata," delete "Sakai" and insert --Sakai-Shi--.

On the title Page [73] Assignee: after "Minolta Co., Ltd.," delete "Osaki," and insert --Osaka-Shi, Osaka,--.

Column 11, line 17, after "end", delete "as", and insert --of--.

Column 12, line 32, delete "If", and insert --if--.

Column 21, claim 7, line 17, after "unit," and insert --wherein--.

Column 21, claim 11, line 49, delete "tho", and insert --the--.

Signed and Sealed this

Twentieth Day of March, 2001

Attest:

NICHOLAS P. GODICI

*Attesting Officer*   *Acting Director of the United States Patent and Trademark Office*